United States Patent
Relyea et al.

(10) Patent No.: US 9,587,949 B2
(45) Date of Patent: Mar. 7, 2017

(54) POSITION-BASED TAGS, REMINDERS, AND MESSAGING

(75) Inventors: Donald H. Relyea, Dallas, TX (US); Michelle Felt, Randolph, NJ (US); Alex Zavatone, Irving, TX (US); Summer Westbrook, Plano, TX (US); Jeff Wayne Kurtti, Prosper, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 1229 days.

(21) Appl. No.: 12/415,097

(22) Filed: Mar. 31, 2009

(65) Prior Publication Data

US 2010/0250131 A1    Sep. 30, 2010

(51) Int. Cl.
  G01C 21/20   (2006.01)
  H04W 4/02   (2009.01)
  H04W 4/18   (2009.01)
  H04L 29/08   (2006.01)

(52) U.S. Cl.
  CPC .............. *G01C 21/20* (2013.01); *H04L 67/18* (2013.01); *H04W 4/02* (2013.01); *H04W 4/185* (2013.01)

(58) Field of Classification Search
  CPC ......... G01C 21/20; H04W 4/02; H04W 4/185
  See application file for complete search history.

(56) References Cited

U.S. PATENT DOCUMENTS 7,664,815 B2 * 2/2010 Gundersen et al. .......... 709/204
7,720,844 B2 * 5/2010 Chu et al. ..................... 707/724

2001/0031640 A1 * 10/2001 Waller et al. ................. 455/456
2002/0045456 A1 *  4/2002 Obradovich ............ H04W 4/02
                                                                                    455/457
2006/0148488 A1 *  7/2006 Syrbe .......................... 455/456.1
2007/0281716 A1 * 12/2007 Altman et al. ................ 455/466

(Continued)

FOREIGN PATENT DOCUMENTS

GB          2385748 A  *  8/2003  .............. H04W 8/14

*Primary Examiner* — Hiep V Nguyen

(57) ABSTRACT

A method performed by a user device may include determining a geographical position of the device, receiving a description of the geographical position, receiving a selection of one or more individuals to share the geographical position and the description, and saving the geographical position and the description, on another device, to permit access to the geographical position and the description, on the other device, according to the selection of the one or more individuals. Another method performed by a user device may include determining a geographical position of the user device, receiving reminder information that is tied with the geographical position, receiving a selection of a user in which the reminder information and the geographical position pertains, and notifying the user of the reminder information a next time that the user device is at or within a specified distance from the geographical position. A further method performed by a user device may include determining a geographical position of the user device, creating a text message that integrates the geographical position in an attachment that causes a recipient user device to perform an automatic wake-up call of a position-based application for locating the geographical position of the user device, and transmitting the text message that integrates the geographical position to the recipient user device.

21 Claims, 17 Drawing Sheets

(56) References Cited

U.S. PATENT DOCUMENTS

2009/0005018 A1* 1/2009 Forstall et al. ............ 455/414.1
2009/0047972 A1* 2/2009 Neeraj ....................... 455/456.1
2010/0138416 A1* 6/2010 Bellotti ......................... 707/736

* cited by examiner

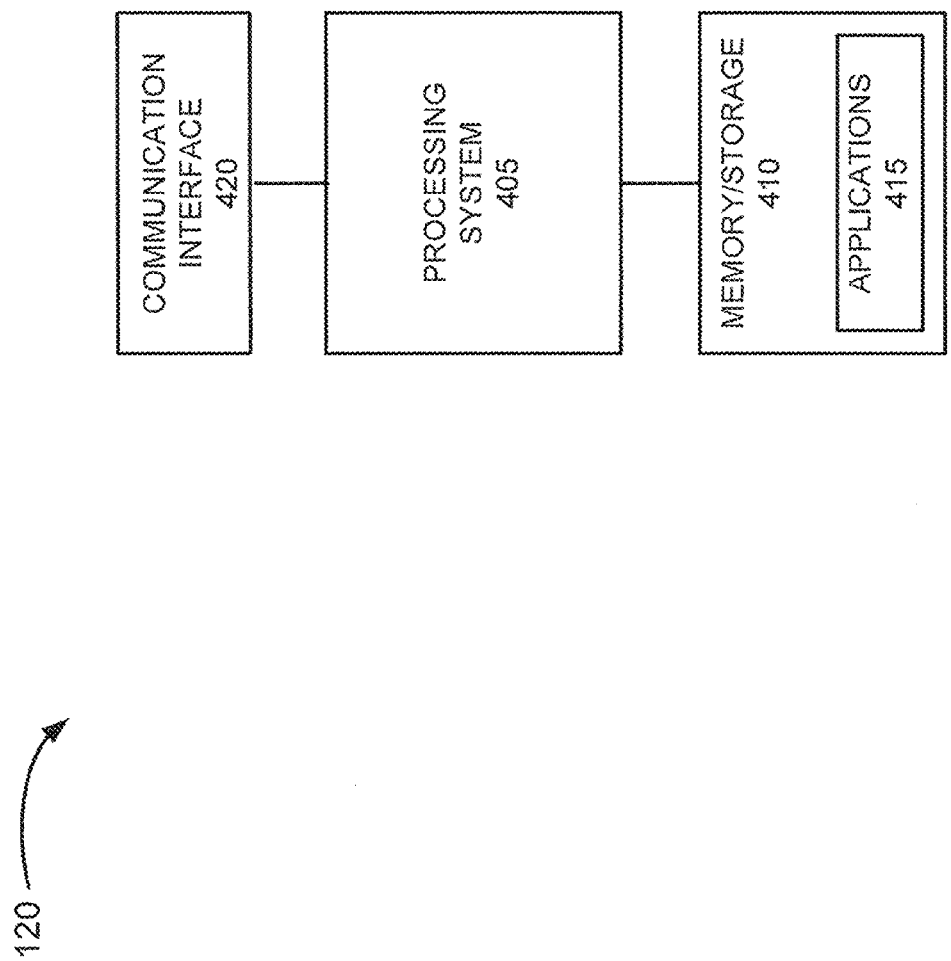

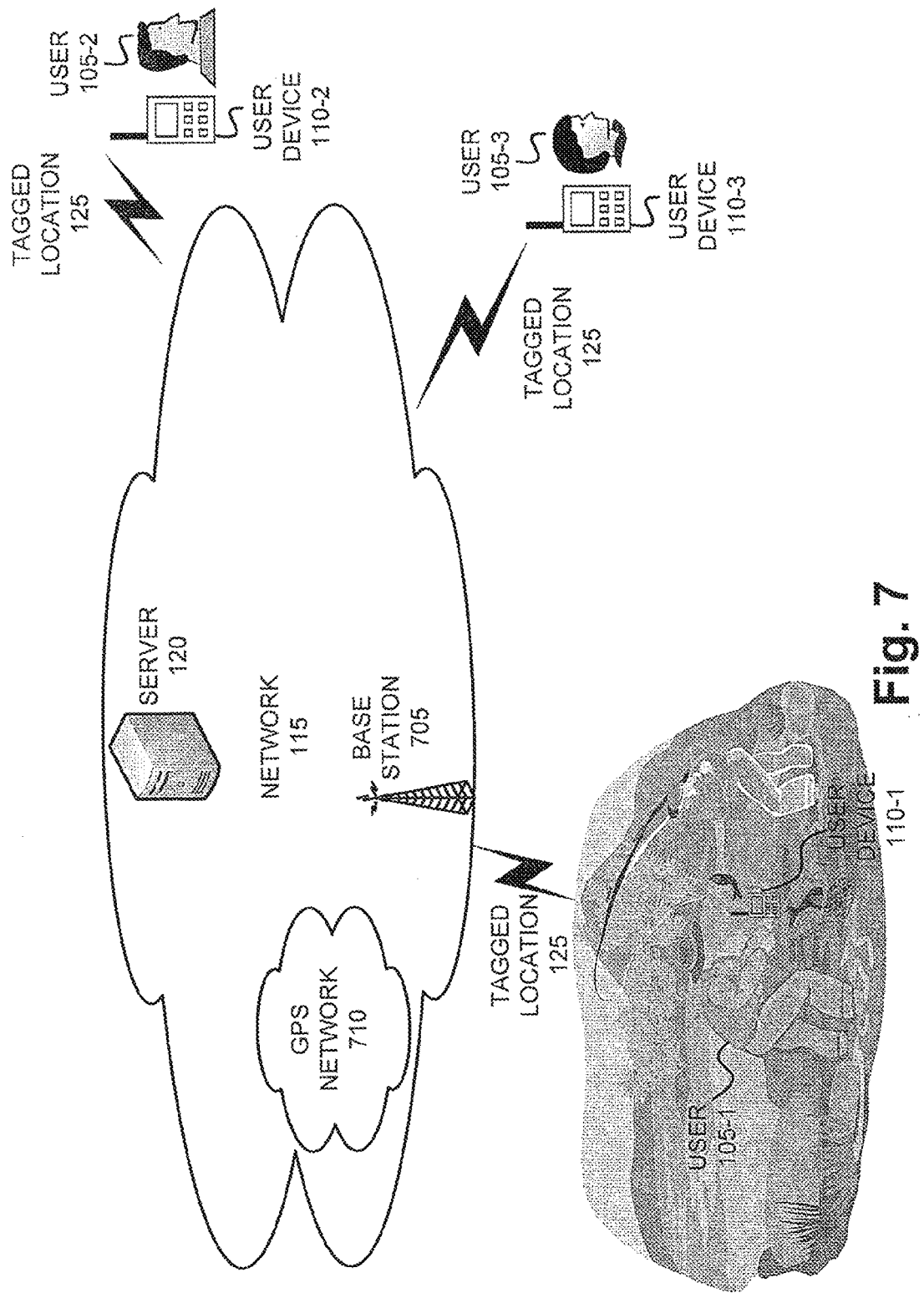

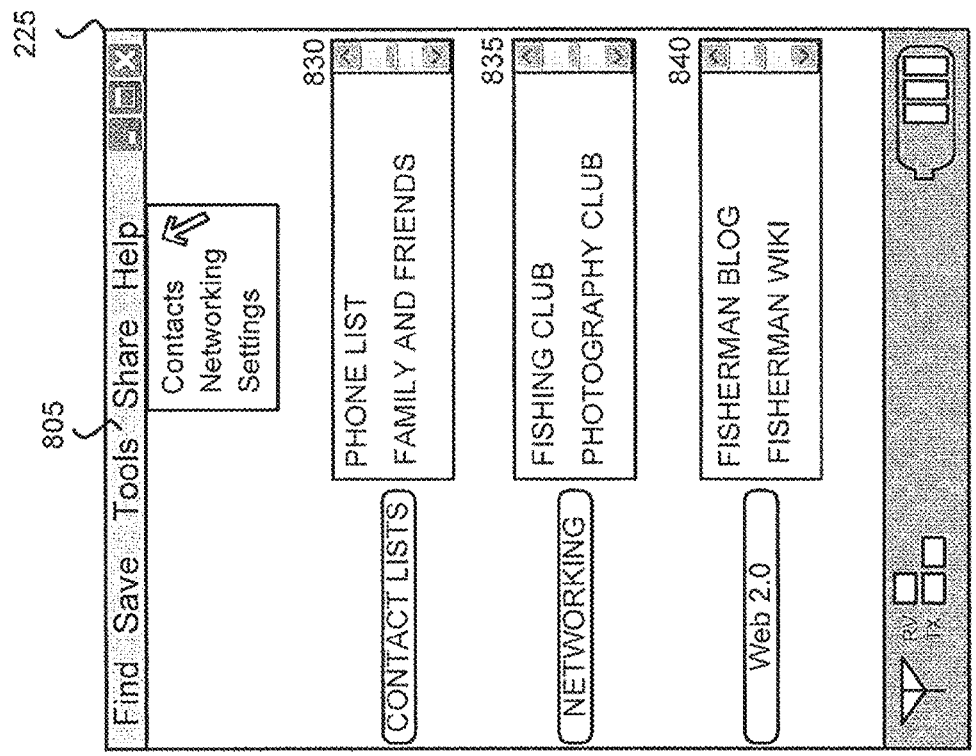
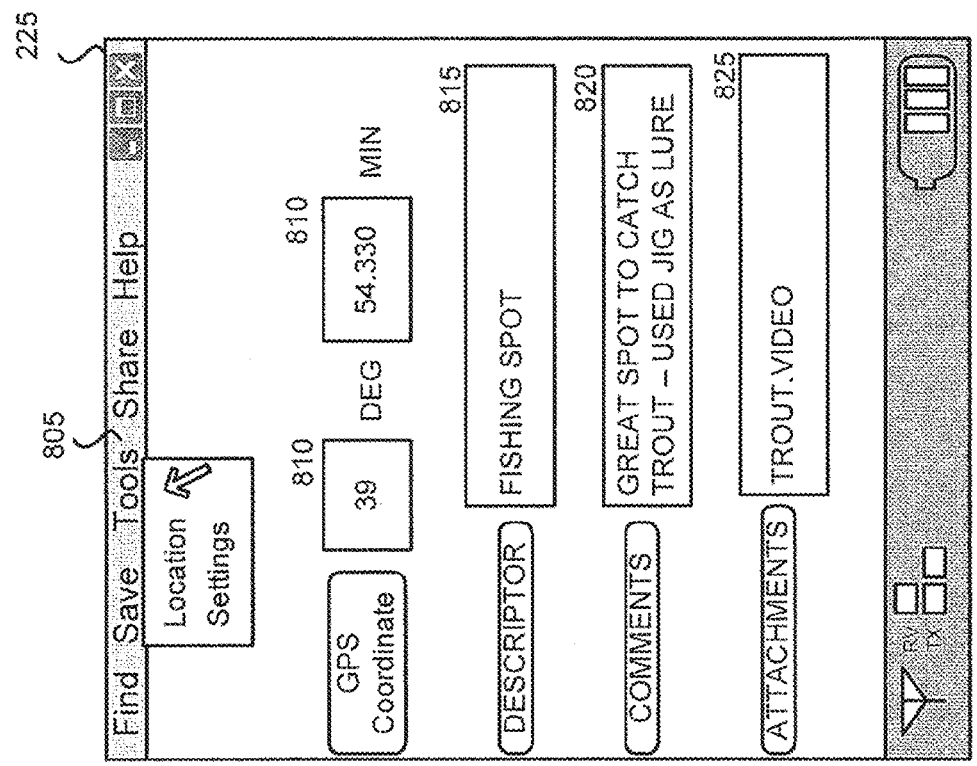
Fig. 8A
Fig. 8B

POSITION-BASED TAGS, REMINDERS, AND MESSAGING

BACKGROUND

A variety of user devices, such as, for example, mobile phones, personal digital assistants (PDAs), web browsing devices, and the like, may allow a user to obtain geographical position information. For example, a user device may include a global positioning system (GPS) receiver.

BRIEF DESCRIPTION OF THE DRAWINGS

FIG. 4 is a diagram illustrating exemplary components of the server of FIG. 1A;

FIG. 7 is a diagram illustrating an exemplary scenario involving tagging a location;

FIGS. 8A and 8B are diagrams illustrating exemplary graphical user interfaces (GUIs) implemented at the user device of FIG. 2;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein relate to the sharing of position-based tags, creating reminders tied to a particular location, and creating a message that integrates a geographic position of a sending device that causes a position-based application on a receiving device to automatically wake-up (i.e., launch) and provide navigation information to a user. In one embodiment, for example, a user may tag (i.e., store) a location and share the tagged location with family, friends, the user's contact list, the user's social network, etc. In another embodiment, for example, a user may be reminded of something when arriving at or near a particular location. In still another embodiment, by way of example, a user, via a user device, may send a text message, which integrates a location of the user, to another user, via another user device. When the receiving user device receives the text message having the integrated location, the receiving user device may initiate an automatic wake-up call to launch a position-based application. The other user may determine the location of the user via the position-based application based on the location information integrated in the received text message.

It will be appreciated that a variety of technologies or techniques (e.g., GPS, cellular positioning methods (e.g., triangulation, etc.), local positioning methods (e.g., Bluetooth, IEEE 802.11, Ultra Wide Band, etc.)) exist to identify a geographic position associated with a person or a device. However, these technologies may provide the person's geographic position or a geographic position of the device with different degrees of precision or accuracy. While, a GPS is a popular technology that enables the person or the device to obtain geographic positional information, the GPS typically does not work well inside buildings or underground due to the absence of line of sight to satellites and attenuation and scattering of signals caused by roofs, walls, and other objects. In this regard, other technologies, such as, for example, an indoor positioning system (IPS) may be utilized. Thus, while the description that follows may describe embodiments that utilize a GPS, it will be appreciated that other technologies or techniques may be utilized to obtain the geographic position of the device or the person.

Figure 1A:
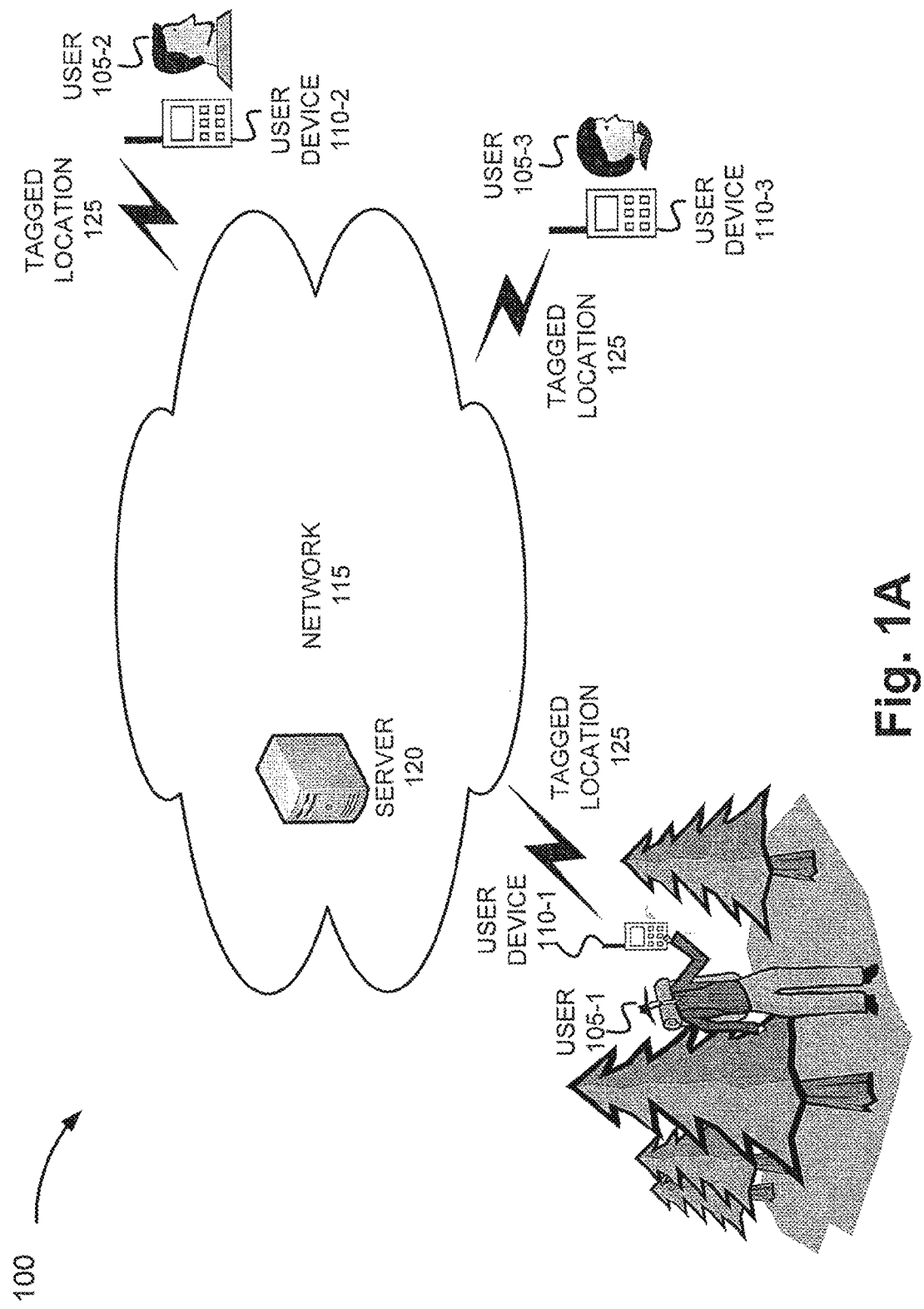
FIGS. 1A-1C are diagrams illustrating overviews of exemplary embodiments described herein.
Figure 1B:
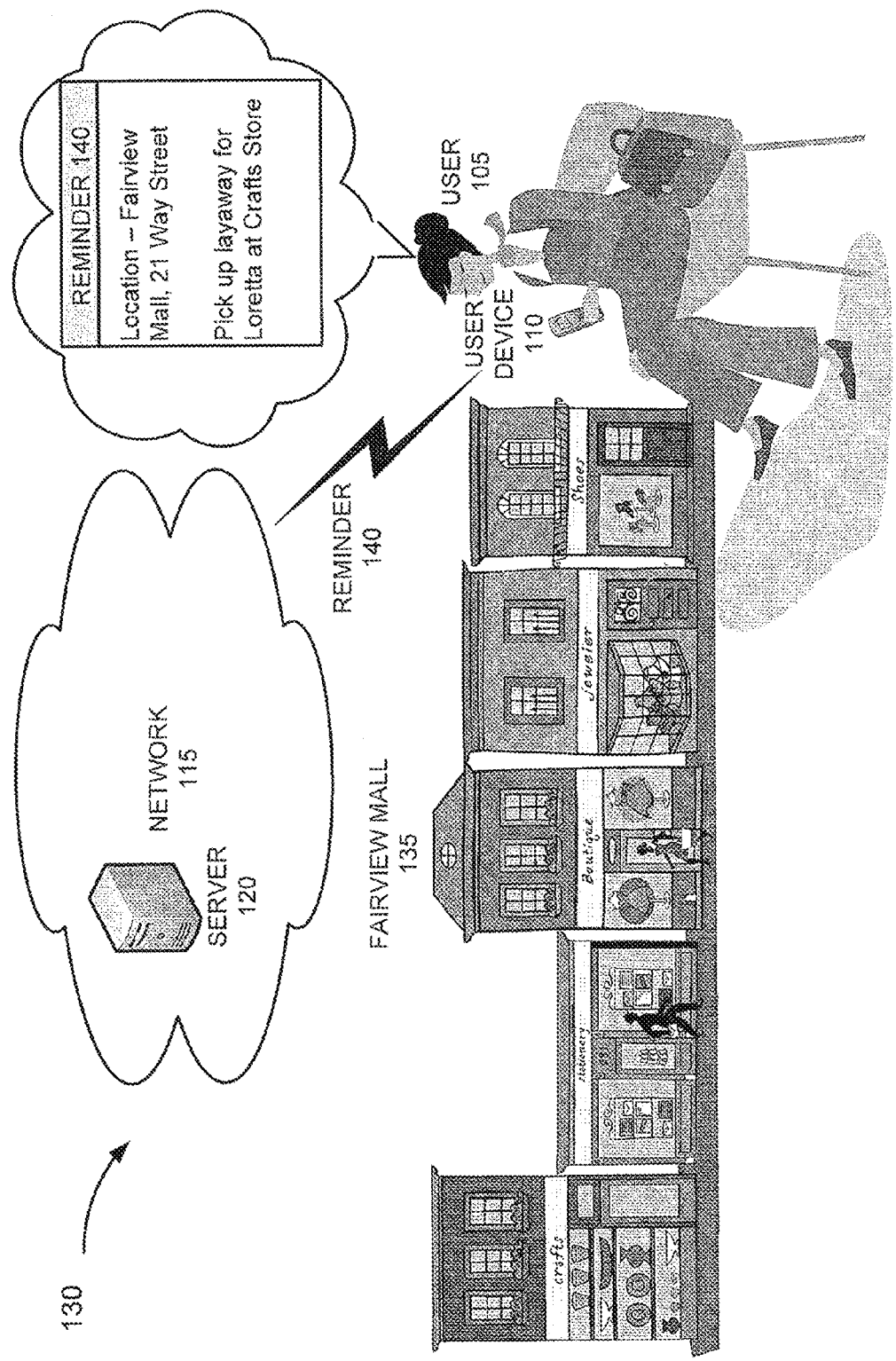
Figure 1C:
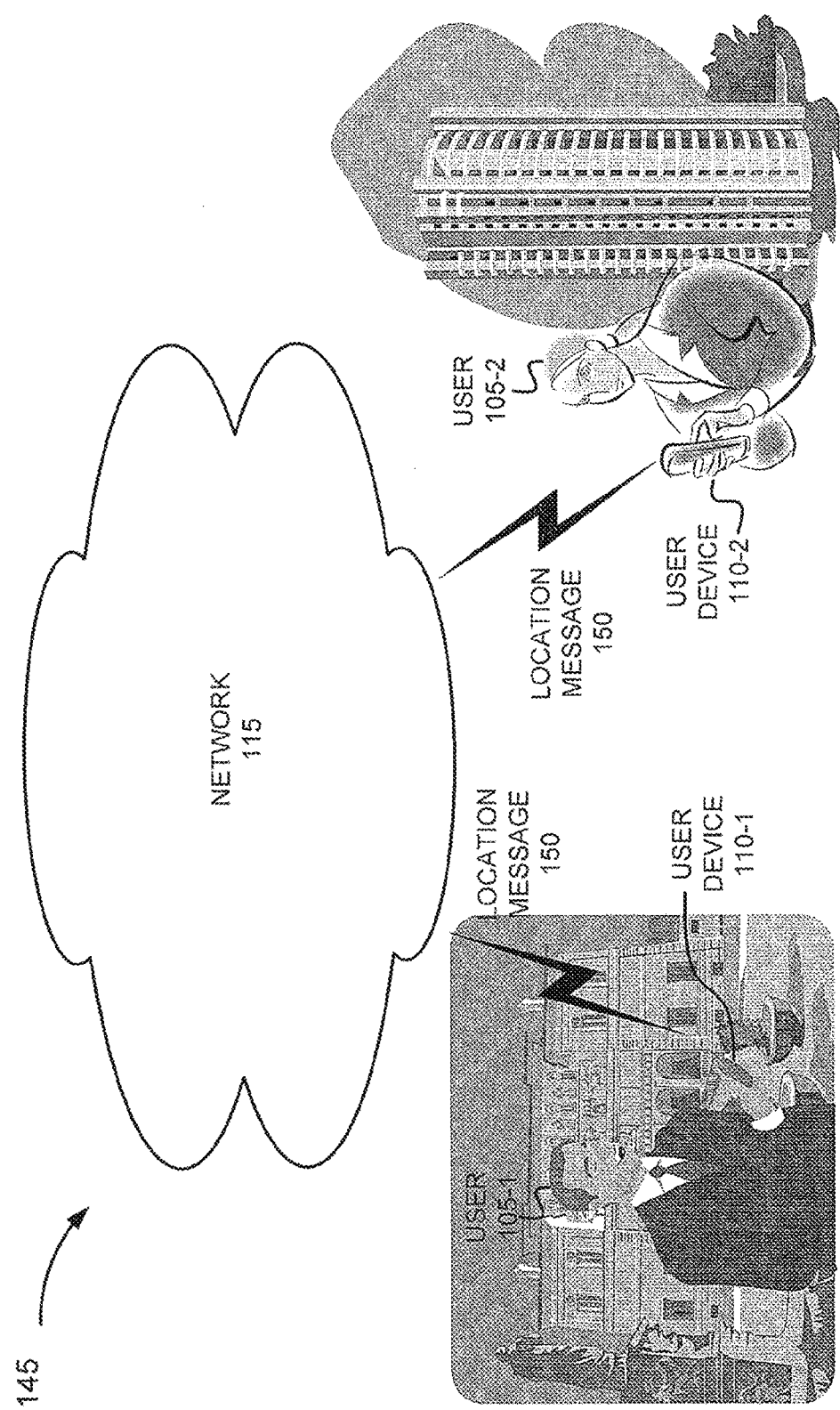

FIGS. 1A-1C are diagrams illustrating overviews of exemplary embodiments described herein. As illustrated in FIG. 1A, an exemplary environment 100 may include users 105-1 through 105-3, user devices 110-1 through 110-3 (referred to generically as user device 110), and a network 115 that includes a server 120.

User device 110 may include a device having communication capability. By way of example, user device 105 may include a wireless telephone (e.g., a mobile phone, a cellular phone), a computational device (e.g., a computer), a PDA, a web-browsing device, a music playing device, a video playing device, a personal communication systems (PCS) device, a gaming device, a navigation device (e.g., a GPS-based device), a vehicle-based device, and/or some other type of portable, mobile, or handheld device.

Network 115 may include any type of network. By way of example, network 115 may include a local area network (LAN), a wide area network (WAN), a telephone network, such as a Public Switched Telephone Network (PSTN) or a Public Land Mobile Network (PLMN), a satellite network, an intranet, the Internet, a data network, a wireless network, a wired network, or a combination of networks or communication systems.

Server 120 may include a network device having communication capability. By way of example, server 120 may include a network computer. In one implementation, server 120 may correspond to a Web server.

By way of example, assume user 105-1 is hiking in the woods and locates a scenic area for taking photographs. User 105-1 may save his or her geographic position on user device 110-1 as a tagged location 125. It will be appreciated that tagged location 125 may include information, in addition to geographic positional information, such as, for example, a picture, a video, text, a voice message, day and time, and/or other information that user 105-1 desires. User 105-1 may also save tagged location 125 on server 120 in network 115, which may be accessible to users 105-2 and 105-3. For example, user 105-2 may belong to the same photography club as user 105-1, and user 105-3 may be a friend of user 105-1. In this way, user 105-1 is able to tag (i.e., store) a location of interest and share that location (and other information) with others (e.g., persons within user's 105-1 social network(s), persons included in user's 105 contact list(s), etc.), such as, users 105-2 and 105-3.

In FIG. 1B, an exemplary environment 130 may include user 105, user device 110, and network 115 that includes server 120. By way of example, assume that user 105 is located near Fairview Mall 135. User 105 is late for an appointment, but remembers that she promised her friend, Loretta, to pick up an item put on layaway at a Crafts Store that is located in Fairview Mall 135. User 105 would like to fulfill her promise to Loretta the next time she visits Fairview Mall 135, so user 105 creates a reminder. User 105 may save her geographic position and create a reminder 140 tied to the saved location on user device 110. User device 110 may permit user 105 to configure a variety of preferences associated with reminder 140, such as, for example, when reminder 140 will be triggered (e.g., when user 105 is within a certain distance from Fairview Mall 135), the manner in which user 105 is reminded (e.g., text message, e-mail, alarm, video, audio, etc.), and who is to be reminded (e.g., yourself, someone else). In this instance, user 105 may be reminded to pick up the item for her friend, Loretta, the next time she visits or is in the vicinity of Fairview Mall 135 or the Crafts store. Reminder 140 may also be stored on server 120, which could be queried by user 105. For example, user 105 may save a location without saving reminder information. However, server 120 may provide reverse look-up services and suggest possible reasons for reminder 140 based on points of interests within the area of the saved location, user history of saved reminders, etc.

In FIG. 1C, an exemplary environment 145 includes users 105-1 and 105-2, user devices 110-1 and 110-2, and network 115. By way of example, user 105-1 may be texting (e.g., Short Messaging Service (SMS) or Multimedia Messaging Service (MMS)) user 105-2 to meet him at the museum. However, user 105-2 may be new to the area and does not know her way around town. User device 110-1 may permit user 105-1 to send a text message that integrates the geographical position of user 105-1 (e.g., location message 150), via network 115, to user 105-2. For example, the application may cooperatively operate with a position-based application (e.g., a GPS-based application) and provide an attachment containing the geographic position of user 105-1. User 105-2 may receive location message 150 with the geographical position of user 105-1. The received location message 150 may cause user device 110-2 to initiate an automatic wake-up call to a GPS-based application on user device 110-2. Thereafter, when the GPS-based application is launched, user 105-2 may navigate towards user 105-1 based on received location message 150.

As a result of the foregoing, a user device may permit a user to save a geographic position (and other information) and share the geographic position (and the other information) with others. Additionally, the user device may permit a user to create a reminder that is tied to a particular geographic position or vicinity. Additionally, the user device may permit a user to send a message, such as a text message, that integrates a geographical position of the user, to another user. The user device may automatically launch a position-based application when the message is received, so that a user may navigate to the other user. Since embodiments and implementations have been broadly described, variations to the above embodiments and implementations will be discussed further below.

Figure 2:
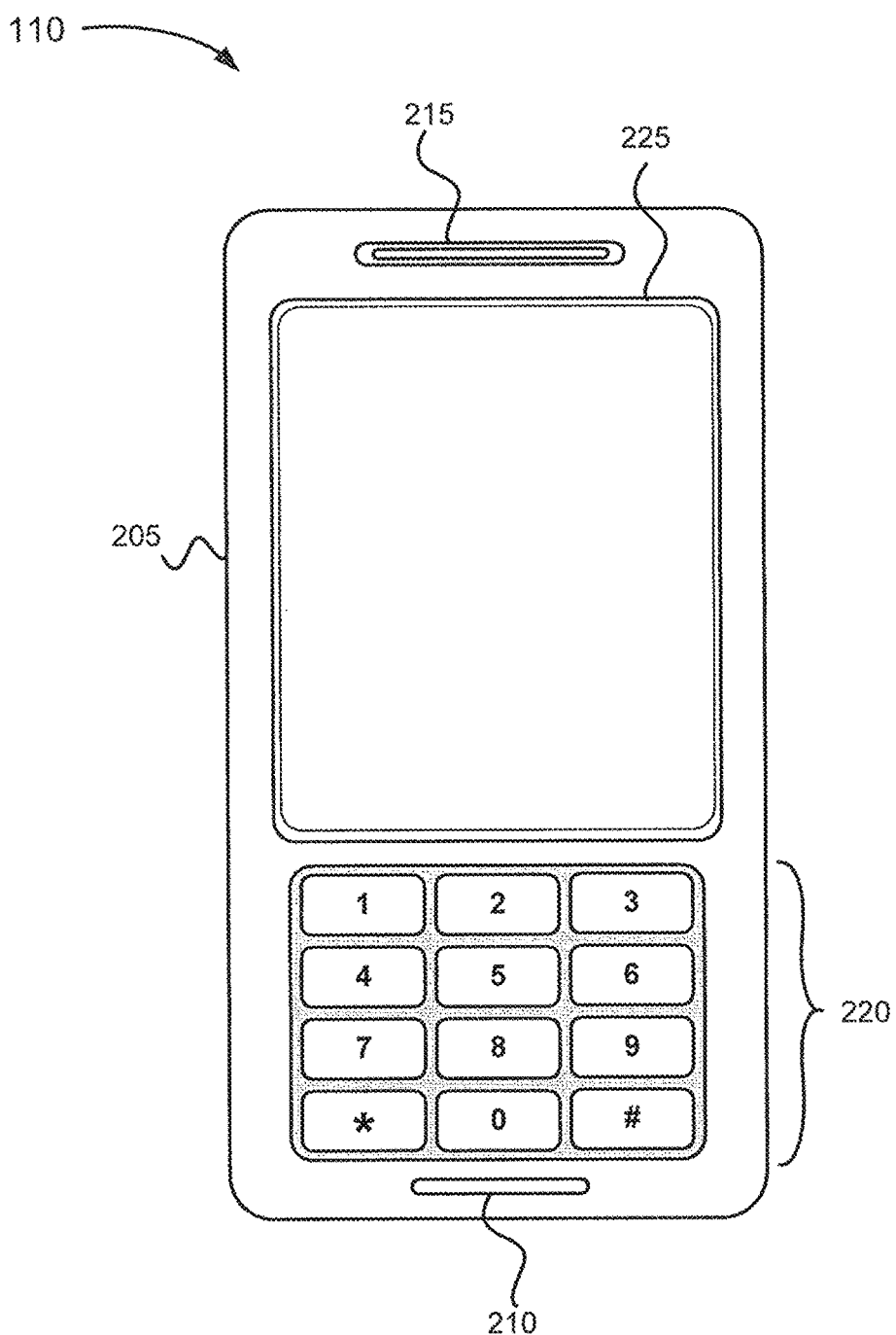
FIG. 2 is a diagram of an exemplary user device in which embodiments described herein may be implemented.

FIG. 2 is a diagram of an exemplary user device 105 in which the embodiments described herein may be implemented. As illustrated in FIG. 2, user device 110 may include a housing 205, a microphone 210, a speaker 215, a keypad 220, and a display 225. In other embodiments, user device 110 may include fewer, additional, and/or different components, or a different arrangement of components than those illustrated in FIG. 2 and described herein.

Housing 205 may include a structure to contain components of user device 110. For example, housing 205 may be formed from plastic, metal, or some other material. Housing 205 may support microphone 210, speaker 215, keypad 220, and display 225.

Microphone 210 may transduce a sound wave to a corresponding electrical signal. For example, a user may speak into microphone 210 during a telephone call or to execute a voice command. Speaker 215 may transduce an electrical signal to a corresponding sound wave. For example, a user may listen to music or listen to a calling party through speaker 215.

Keypad 220 may provide input to device 105. Keypad 220 may include a standard telephone keypad, a QWERTY keypad, and/or some other type of keypad. Keypad 220 may also include one or more special purpose keys. In one implementation, each key of keypad 220 may be, for example, a pushbutton. A user may utilize keypad 220 for entering information, such as text or activating a special function.

Display 225 may output visual content and may operate as an input component. For example, display 225 may include a liquid crystal display (LCD), a plasma display panel (PDP), a field emission display (FED), a thin film transistor (TFT) display, or some other type of display technology. Display 225 may display, for example, text, images, and/or video information to a user. In one implementation, display 225 may include a touch-sensitive screen. Display 225 may correspond to a single-point input device (e.g., capable of sensing a single touch) or a multipoint input device (e.g., capable of sensing multiple touches that occur at the same time). Display 225 may implement, for example, a variety of sensing technologies, including but not limited to, capacitive sensing, surface acoustic wave sensing, resistive sensing, optical sensing, pressure sensing, infrared sensing, etc.

Figure 3:
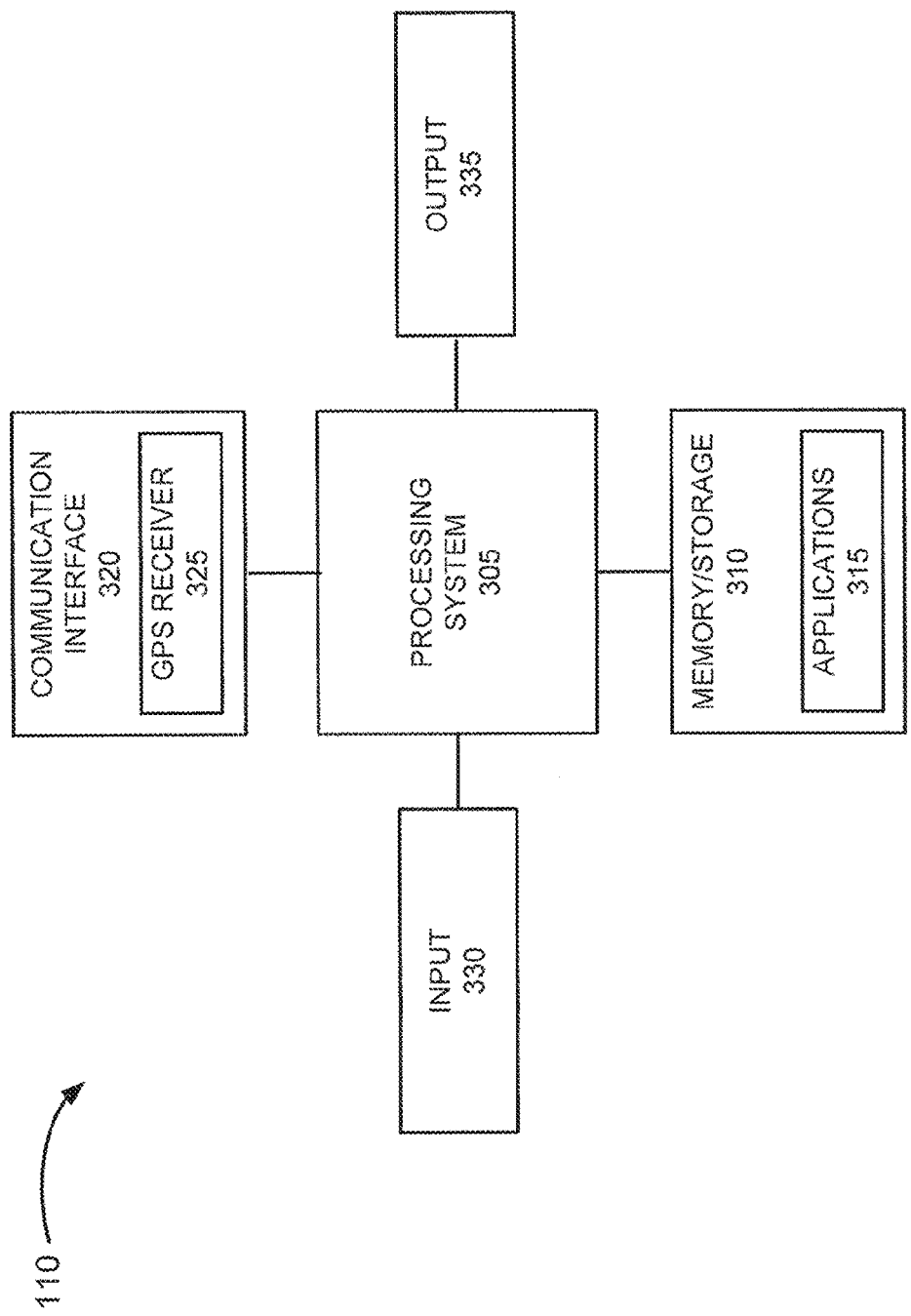
FIG. 3 is a diagram illustrating exemplary components of the user device of FIG. 1A.

FIG. 3 is a diagram illustrating exemplary components of user device 110. As illustrated, user device 110 may include a processing system 305, a memory/storage 310, a communication interface 320, a GPS receiver 325, an input 330, and an output 335. In other embodiments, user device 105 may include fewer, additional, and/or different components, or a different arrangement of components than those illustrated in FIG. 3 and described herein.

Processing system 305 may include one or more processors, microprocessors, data processors, co-processors, network processors, application specific integrated circuits (ASICs), controllers, programmable logic devices, chipsets, field programmable gate arrays (FPGAs), or some other component that may interpret and/or execute instructions and/or data. Processing system 305 may control the overall use of user device 110 based on an operating system and/or various applications. Processing system 305 may interpret and/or execute instructions and/or data.

Memory/storage 310 may include memory and/or secondary storage. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, etc.) or some other type of computer-readable medium, along with a corresponding drive. The term "computer-readable medium" is intended to be broadly interpreted to include a memory, a secondary storage, a compact disc (CD), a digital versatile disc (DVD), etc. The computer-readable medium may be implemented in a single device, in multiple devices, in a centralized manner, or in a distributed manner.

Memory/storage 310 may store data, application(s), and/or instructions related to the operation of user device 105. For example, memory/storage 310 may include a variety of applications 315, such as, for example, an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Communication interface 320 may permit user device 105 to communicate with other devices, networks, and/or systems. For example, communication interface 320 may include an Ethernet interface, a radio interface, a microwave interface, or some other type of wireless or wired interface. GPS receiver 325 may include an antenna/receiver to receive signals (e.g., GPS satellite broadcasts or other forms of positional signals).

Input 330 may permit a user and/or another component to input information in user device 110. For example, input component 330 may include a keyboard, keypad 220, display 225, a touchpad, a mouse, a button, a switch, a microphone, an input port, voice recognition logic, and/or some other type of visual, auditory, etc., input component. Output 335 may permit user device 110 to output information to a user and/or another component. For example, output 335 may include display 225, speaker 215, one or more light emitting diodes (LEDs), an output port, a vibrator, and/or some other type of visual, auditory, tactile, etc., output component.

FIG. 4 is a diagram illustrating exemplary components of server 120. As illustrated, server 120 may include a processing system 405, a memory/storage 410, and a communication interface 420. In other embodiments, server 120 may include fewer, additional, and/or different components, or a different arrangement of components than those illustrated in FIG. 4 and described herein.

Processing system 405 may include one or more processors, microprocessors, data processors, co-processors, network processors, application specific integrated circuits (ASICs), controllers, programmable logic devices, chipsets, field programmable gate arrays (FPGAs), or some other component that may interpret and/or execute instructions and/or data. Processing system 405 may control the overall operation of server 120 based on an operating system and/or various applications. Processing system 405 may interpret and/or execute instructions and/or data.

Memory/storage 410 may include memory and/or secondary storage. For example, memory/storage 410 may include a random access memory (RAM), a dynamic random access memory (DRAM), a read only memory (ROM), a programmable read only memory (PROM), a flash memory, and/or some other type of memory. Memory/storage 410 may include a hard disk (e.g., a magnetic disk, an optical disk, a magneto-optic disk, etc.) or some other type of computer-readable medium, along with a corresponding drive.

Memory/storage 410 may store data, application(s), and/or instructions related to the operation of server 120. For example, memory/storage 410 may include a variety of applications 415, such as, for example, a database application (e.g., a structured query language (SQL)-based application), a notification application, reverse-look-up application, a data-mining application, as well as other applications to perform processes or operations described herein.

Communication interface 420 may permit server 120 to communicate with other devices, networks, and/or systems. For example, communication interface 420 may include an Ethernet interface, a radio interface, a microwave interface, or some other type of wireless or wired interface.

Figure 5A:
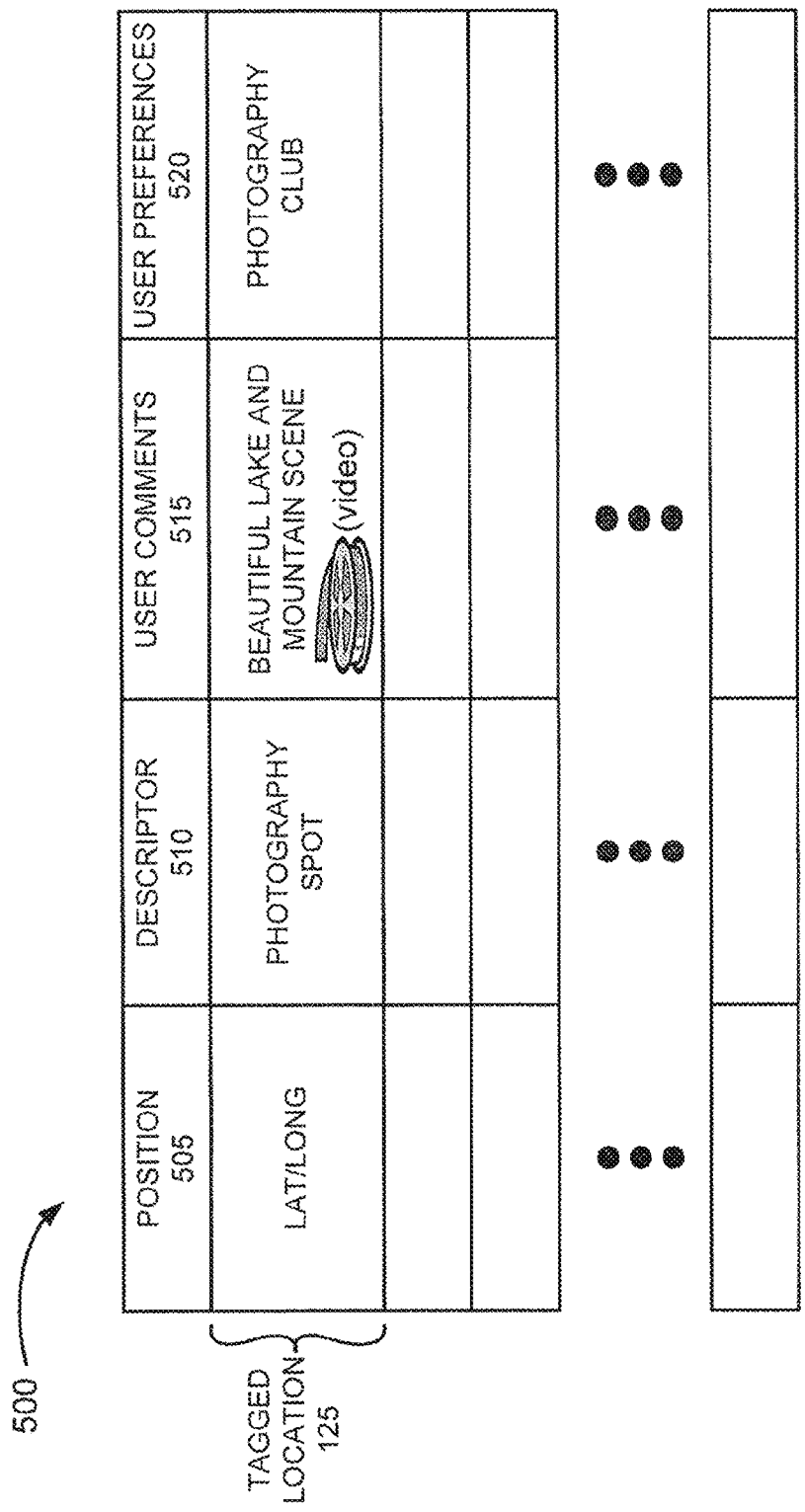
FIG. 5A is a diagram illustrating an exemplary database.

As previously described with respect to FIG. 1A, user 105 may save his or her geographic position as a tagged location 125, and share his or her geographic position (and other information) with others. FIG. 5A is a diagram illustrating an exemplary database 500 that includes information, such as position information and other information, which may be saved and/or shared when a location is tagged. The term "database," as used herein, is intended to be broadly interpreted to include an arrangement of data. For example, a database may correspond to a table or some other type of data structure. Database 500 (or portions thereof) may be stored on memory/storage 410 of server 120. Database 500 (or portions thereof) may also be stored on memory/storage 310 of user device 110. As illustrated, database 500 may include a position field 505, a descriptor field 510, a user comments field 515, and a user preferences field 520.

Position field 505 may include geographic positional information corresponding to a location. For example, position field 505 may include longitude and latitude information (e.g., degrees, minutes, seconds, etc.) or some other type of position information (e.g., geo-codes, etc.). Position field 505 may also include directional information that corresponds to the direction the user is facing when creating tagged location 125 or the direction a user should face when arriving at tagged location 125. By way of example, position field 505 may include directional information, such as, north, south, east, west, northwest, etc. In some instances, this information may be useful in orienting someone when arriving at tagged location 125. Additionally, position field 505 may include altitude information.

Descriptor field 510 may include information that describes the location. For example, descriptor field 510 may include a term(s), a phrase(s), or some other type of coding that categorizes or is a descriptor for the location. By way of example, descriptor field 510 may include a descriptor, such as, fishing spot, photography spot, camping ground, picnic spot, shopping, store, restaurant, etc.

User comments field 515 may include any information that supplements the information in descriptor field 510. For example, user comments field 515 may include information that further describes the location or other information associated with the location (e.g., a photograph, a video, a link to a web site, a user comment, a rating of the location, etc.).

User preferences field 520 may include preferences related to the sharing of the location (and other information). For example, user preferences field 520 may include information related to social networks (e.g., social clubs, social groups, etc.), contact lists, blogs, family circles, friend circles, an individual, Web 2.0 applications, and the like, in which tagged location 125 is to be shared. Other users may be granted access (either on user device 110 or server 120) to one or more fields of tagged location 125 (database 500) based on the information in user preferences field 520.

Although, FIG. 5A illustrates an exemplary database 500, in other implementations, fewer, additional, or different informational fields may be included. For example, database 500 may include a time field that includes a timestamp when the location was tagged. Additionally, or alternatively, database 500 may include information relating to a time limit that the tagged location expires (e.g., an auto expire or a user-configured time period for expiration). Additionally, or alternatively, descriptor field 510 and user comments field 515 may be combined into one field. Alternatively, either descriptor field 510 or user comments field 515 may be omitted. It will be appreciated that database 500 may be implemented in a distributed manner (e.g., among multiple devices (e.g., network servers 120, information repositories, etc.)).

Figure 5B:
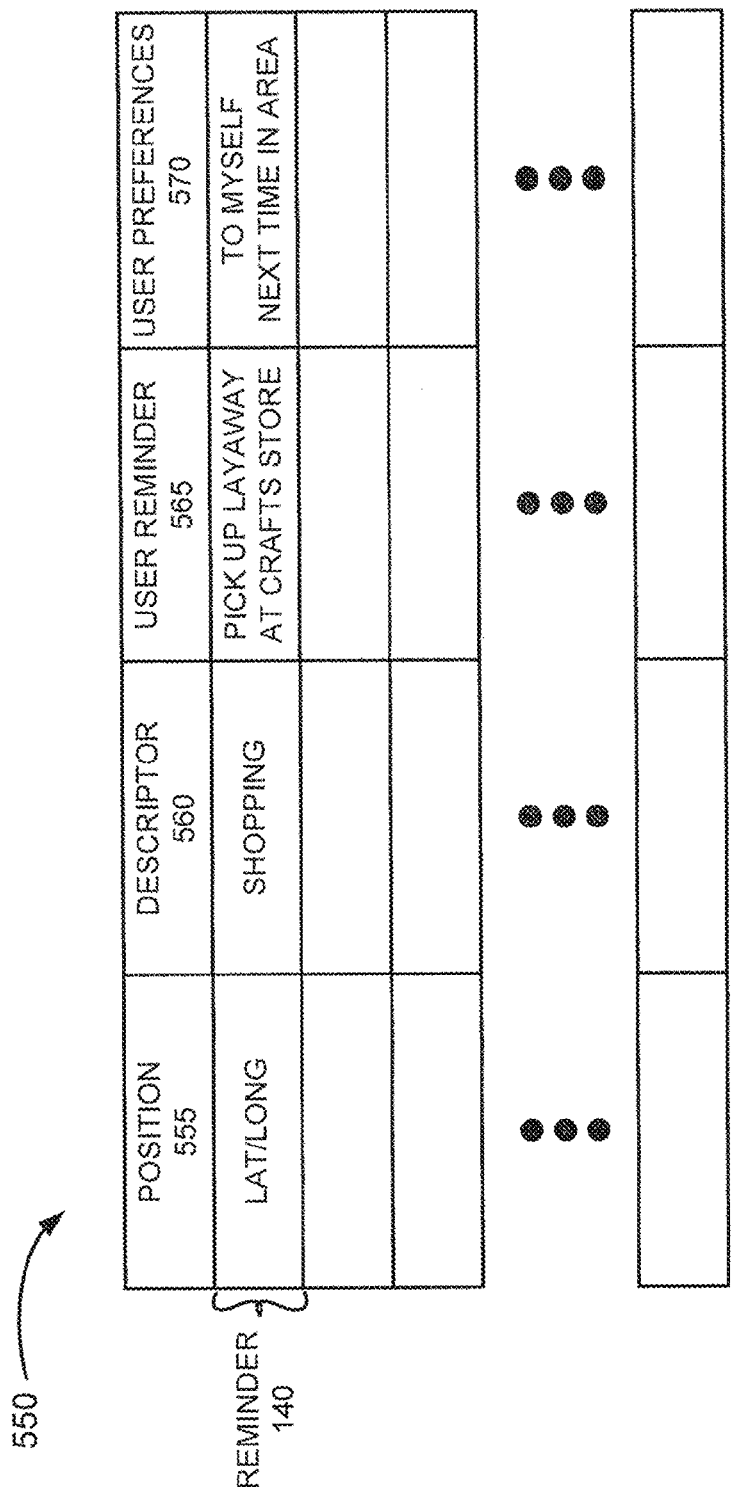
FIG. 5B is a diagram illustrating another exemplary database.

As previously described with respect to FIG. 1B, user 105 may create a reminder that is tied to a particular geographic position. FIG. 5B is a diagram illustrating an exemplary database 550 that includes information, such as position information and other information, which may be saved when a reminder is created. Database 550 (or portions thereof) may be stored on memory/storage 410 of server 120. Database 550 (or portions thereof) may also be stored on memory/storage 310 of user device 110. As illustrated, database 550 may include a position field 555, a descriptor field 560, a user reminder field 565, and a user preferences field 570.

Position field 555 may include geographic positional information corresponding to a location. For example, position field 555 may include longitude and latitude information (e.g., degrees, minutes, seconds, etc.) or some other type of position information (e.g., geo-codes, etc.). Position field 555 may also include directional information that corresponds to the direction the user is facing when creating reminder 140 or the direction a user should face when arriving at the location. By way of example, position field 555 may include directional information, such as, north, south, east, west, northwest, etc. In some instances, this information may be useful in orienting someone when arriving at the location. Additionally, position field 555 may include altitude information.

Descriptor field 560 may include information that describes the location. For example, descriptor field 560 may include a term(s), a phrase(s), or some other type of coding that categorizes or is a descriptor for the location. By way of example, descriptor field 560 may include a descriptor, such as, parked car, shopping, store, restaurant, etc.

User reminder field 565 may include reminder information. For example, user reminder field 565 may include information that tells the user to do something next time the user is at or near the location in position field 555. By way of example, user reminder field 565 may include reminder information, such as, pick up an item, dine somewhere, try a new activity, etc.

User preferences field 570 may include preferences related to reminder 140. For example, user preferences field 570 may include information related to how often the user is to be reminded of reminder 140 (e.g., once, twice, a particular day, a particular day and time, etc), what distance away from a location (i.e., position information in position field 555) triggers reminder 140 (e.g., within X number of mile(s), within X number of yard(s), within X number of feet, etc.), how the user is reminded (e.g., an e-mal, a text message, an audio alert, a video clip, etc.), identifying who reminder 140 is for (e.g., yourself, someone else, a group of individuals), and/or whether the reminder is permanent, reoccurring, one time only, set to expire after a certain period of time or visits, etc. User preferences field 570 may also permit a user to provide settings that allow other users access to one or more fields of reminder 140 (in database 550).

Although, FIG. 5B illustrates an exemplary database 550, in other implementations, fewer, additional, or different informational fields may be included. For example, database 550 may include a time field that includes a timestamp when the reminder was created and/or a field indicating whether user 105 has been reminded or not. Additionally, or alternatively, database 550 may include information relating to a time limit that the tagged location expires (e.g., an auto expire or a user-configured time period for expiration). Additionally, or alternatively, descriptor field 560 and user reminder field 565 may be combined into one field. Alternatively, either descriptor field 560 or user reminder field 565 may be omitted. It will be appreciated that database 550 may be implemented in a distributed manner (e.g., among multiple devices (e.g., network servers 120, information repositories, etc.)).

As previously described, in one embodiment, a user may tag (i.e., store) a location of interest and share that location (and other information) with others (e.g., within the user's social network(s), contact list(s), friend(s), family, Web 2.0 applications, etc). The location (and the other information) may be stored on a server (e.g., server 120) that is accessible to others. Additionally, or alternatively, the user may share the location (and other information) with others by sending the location (and other information) to other user devices.

Figure 6:
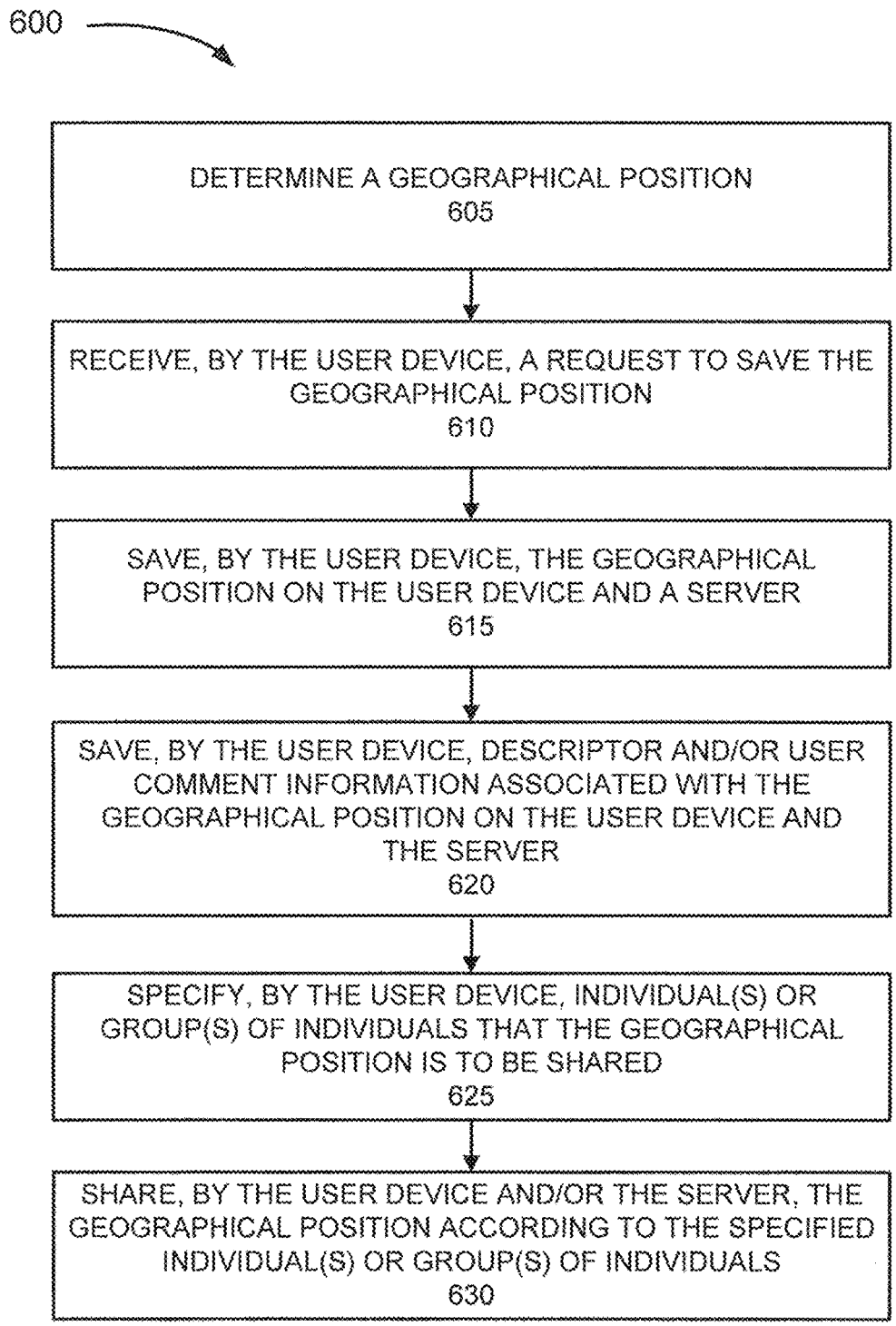
FIG. 6 is a flow diagram illustrating an exemplary process for tagging a location.

FIG. 6 illustrates a flow diagram illustrating an exemplary process 600 for tagging a location according to an exemplary implementation. In one implementation, process 600 may be performed by user device 110. User device 110 may include a touch screen (display 225) that displays a graphical user interface (GUI) of an application 315. By way of example, application 315 may correspond to a GPS-based application that permits user 105 to tag a location and share that location (and other information) with others.

Process 600 may begin with determining a geographical position (block 605). As previously described, there are a variety of technologies or techniques that exist to determine the geographical position of user device 110 (and user 105). Additionally, these technologies or techniques may differ depending on whether user 105 is situated indoors or outdoors. By way of example, user device 110 may include a GPS receiver 325 that is capable of determining the geographical position of user device 110 (and user 105).

FIG. 7 is a diagram illustrating an exemplary scenario involving tagging a location. As illustrated, user 105-1 may be fishing in a secluded area near a river. Given the success user 105-1 is having in catching fish at this location, user 105-1 would like to share this location and (other information) with others (e.g., users 105-2 and 105-3). As further illustrated, user 105-1 may have user device 110-1 and GPS receiver 325 may determine the geographical position of user 105-1 based on signals received from a GPS network 710.

Returning to FIG. 6, a request to save the geographical position may be received (block 610). As previously mentioned, user 105-1 would like to share this location (and other information) with users 105-2 and 105-3. User 105-1 may enter a command to save his geographical position. By way of example, FIGS. 8A and 8B are diagrams illustrating exemplary GUIs of an exemplary application 315 displayed on display 225 of user device 110. It will be appreciated that other GUIs may be implemented that have features different from those shown in FIGS. 8A and 8B and described herein. Further, it will be appreciated that user device 110 may permit user 105 to enter information into user device 110, save information on user device 110 and/or server 120, access and/or modify information saved on user device 110 and/or server 120, in a variety of ways, such as, for example, using keypad 220, performing touch screen gestures, issuing voice commands, etc. As illustrated in FIG. 8A, user 105 may enter a command to save the geographical location by selecting from a menu 805. Fields 810 may include GPS coordinate information. By way of example, the GPS coordinate information may be expressed in degrees and minutes. In other implementations other formats may be utilized (e.g., decimal degrees, degrees, minutes, seconds, longitude, latitude, etc.) depending on the technology or technique utilized for obtaining geographic positional information. Additionally, in some implementations, user device 110 may save directional information that corresponds to the direction user 105 is facing when creating tagged location 125 or the direction user 105 should face when arriving at tagged location 125. Additionally, or alternatively, user device 110 may save altitude information.

Returning to FIG. 6, the geographical position may be saved on the user device and a server (block 615). In response to user's 105-1 request to save, user device 110-1 may save the geographical position (as well as other information) on user device 110-1. For example, user device 110-1 may include database 500. Additionally, by way of example, user device 110-1 may save the geographical position (as well as other information) on server 120 via base station 705. Similarly, server 120 may include database 500.

Descriptor and/or user comment information associated with the geographical position may be saved on the user device and the server (block 620). As previously described, by way of example, user 105-1 may save other information, in addition to the geographical position. For example, as illustrated in FIG. 8A, user 105-1 may save information that describes the saved location in field 815 (which corresponds to descriptor field 510). In this circumstance, user 105-1 may enter "fishing spot" in field 815. User 105-1 may also save supplemental information in field 820 (which corresponds to user comments field 515). For example, in this circumstance, user 105-1 may enter "great spot to catch trout—used jig as lure." User 105-1 may also add pictures, videos, etc. in field 825. In this example, user 105-1 desires to add a video clip of him catching some trout.

Returning to FIG. 6, individual(s) or group(s) of individuals with whom the geographical position is to be shared may be specified (block 625). User 105-1 may share the geographic position (and other information) with others. For example, as illustrated in FIG. 8B, user 105-1 may select individual(s) or group(s) of individuals that may obtain some or all of the saved information of tagged location 125. By way of example, user 105-1 may select from a contacts lists field 830, a networking field 835, and a Web 2.0 field 840 to identify those that will either have access to tagged location 125 (e.g., on server 120), or those that user device 110-1 may send tagged location 125 to their user devices 110. Fields 830, 835 and 840 may correspond to user preferences field 520 of database 500.

Returning to FIG. 6, the geographical position may be shared according to the individual(s) or group(s) of individuals specified (block 630). Based on the selected individual(s) or group(s) of individuals, other users 105 may have access to or receive some or all of the information associated with tagged location 125. For example, as illustrated in FIG. 7, users 105-2 and/or 105-3 may access server 120 to obtain tagged location 125. Additionally, or alternatively, users 105-2 and/or 105-3 may receive tagged location 125 from user device 110-1. In one implementation, server 120 may provide notification to users 105 identified to have access to tagged location 125. For example, applications 415 of server 120 may alert or let users 105 know (e.g., by e-mail, text message, auditory cue, etc.) that a tagged location 125 has been saved on server 120.

Although FIG. 6 illustrates an exemplary process 600, in other implementations, fewer, additional, or different operations may be performed. For example, the performance of block 625 may be omitted when user preferences have already been set. In such circumstances, user 105 may reuse these settings for subsequently created tagged locations 125. Additionally, it will be appreciated that other operations may be performed in association with user 105 tagging a location. For example, user 105-1 (and other users 105) may access server 120 to modify, add, delete, etc., information associated with tagged location 125.

According to another embodiment, a user may create a reminder that is tied to a particular location. The user may create the reminder for himself or herself, or for someone else. The reminder may be stored on a server (e.g., server 120) and/or user device 110.

Figure 9:
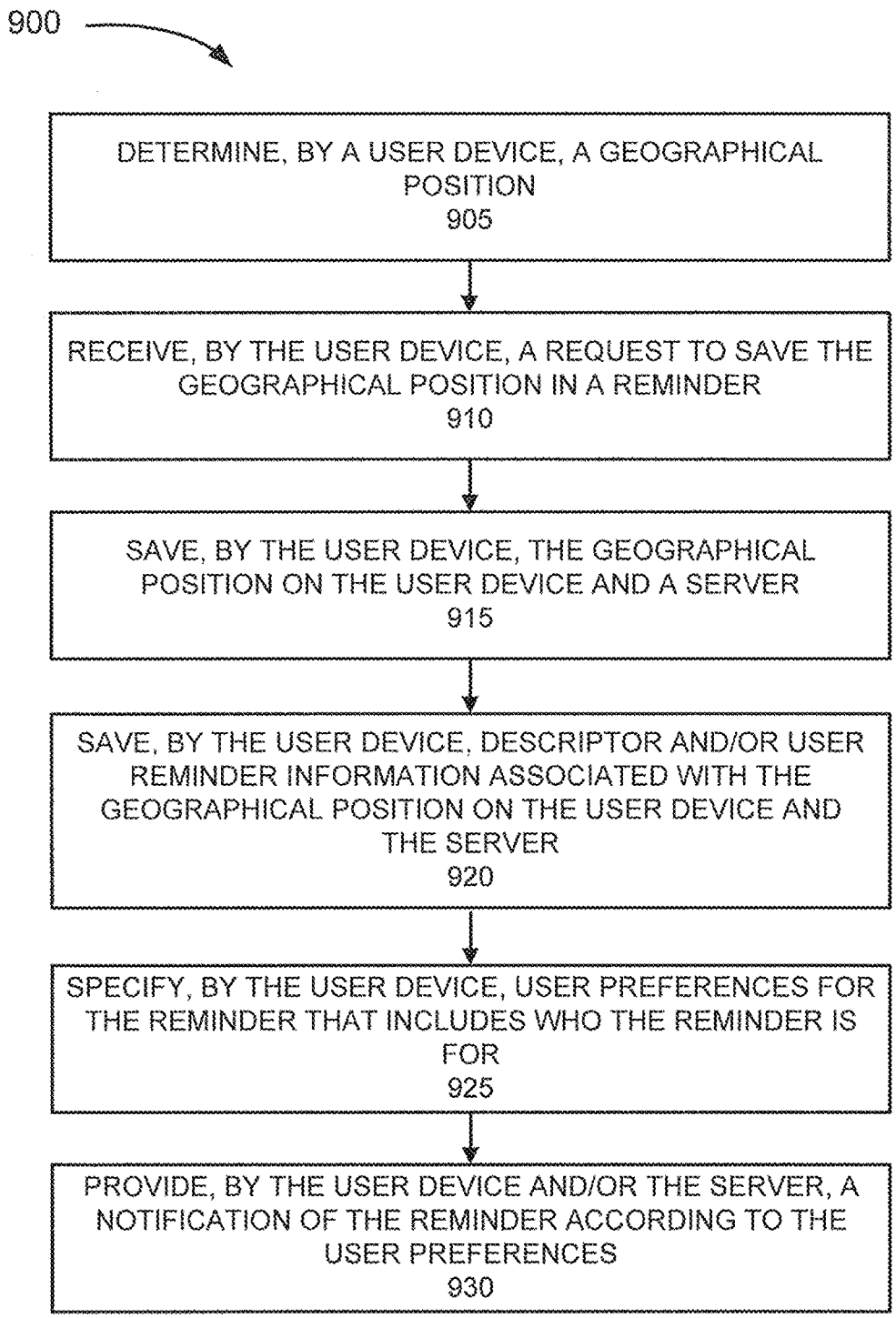
FIG. 9 is a flow diagram illustrating an exemplary process for creating a reminder tied to a particular location.

FIG. 9 illustrates a flow diagram illustrating an exemplary process 900 for creating a reminder that is tied to a particular location according to an exemplary implementation. In one implementation, process 900 may be performed by user device 110. User device 110 may include a touch screen (display 225) that displays a graphical user interface (GUI) of an application 315. By way of example, application 315 may correspond to a GPS-based application that permits user 105 to create a reminder that is tied to a particular location.

Process 900 may begin with determining a geographical position (block 905). As previously described, there are a variety of technologies or techniques that exist to determine the geographical position of user device 110 (and user 105). Additionally, these technologies or techniques may differ depending on whether user 105 is situated indoors or outdoors. By way of example, user device 110 may include a GPS receiver 325 that is capable of determining the geographical position of user device 110 (and user 105).

Figure 10:
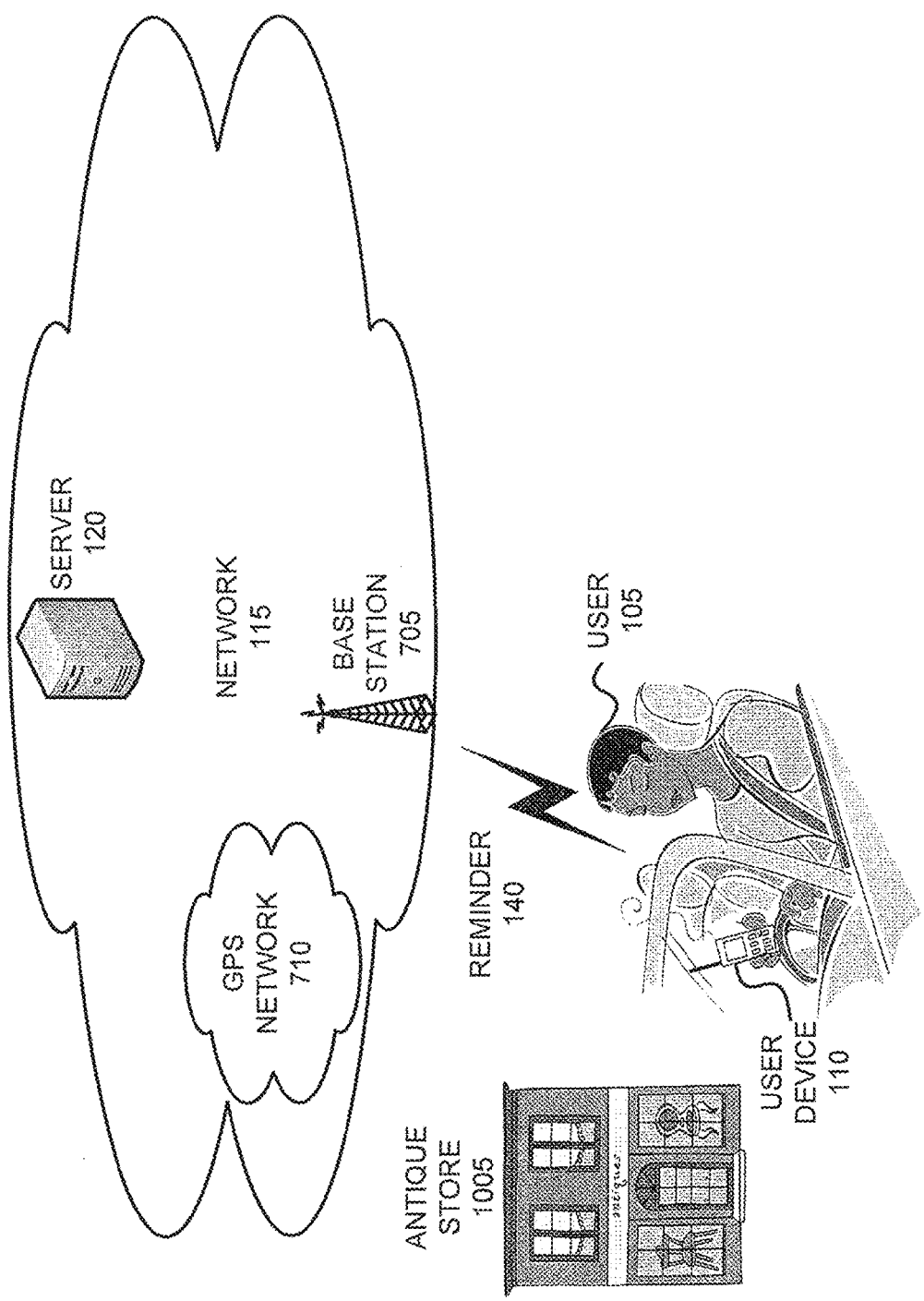
FIG. 10 is a diagram illustrating an exemplary scenario involving creating a reminder.

FIG. 10 is a diagram illustrating an exemplary scenario involving creating a reminder. As illustrated, user 105 may be driving in a car to visit a friend. On the way, user 105 notices an antique store 1005 that has newly opened. User 105 enjoys collecting antique items and decides that she would like to create a reminder 140 so that next time she is in the area, she can visit antique store 1005. As further illustrated, user 105 may have user device 110, and GPS receiver 325 may determine the geographical position of user 105 based on signals received from GPS network 710.

Figure 11B:
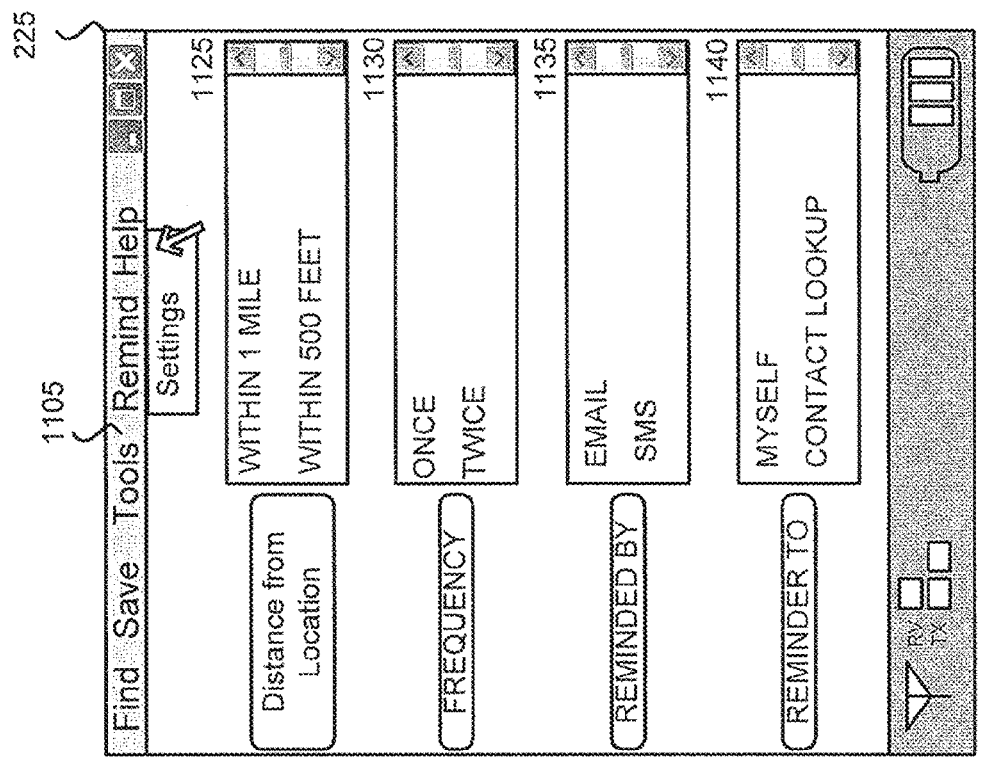
FIGS. 11A and 11B are diagrams illustrating exemplary GUIs implemented at the user device of FIG. 2.
Figure 11A:
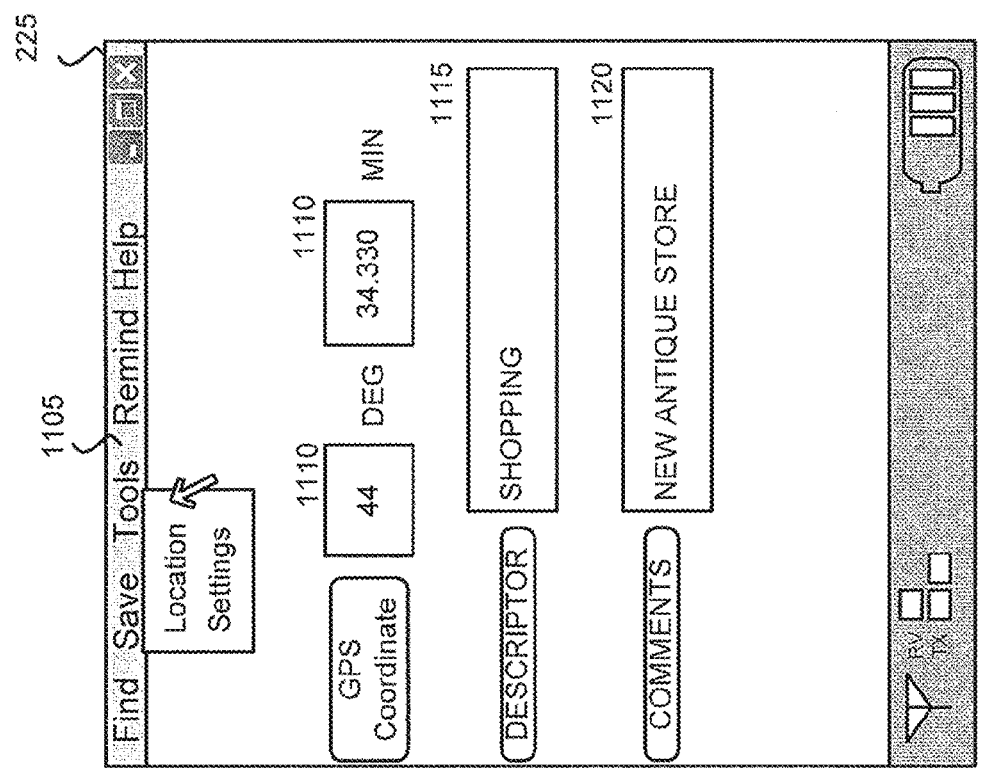

Returning to FIG. 9, a request to save the geographical position in a reminder may be received (block 910). As previously mentioned, user 105 would like to create a reminder 140. User 105 may enter a command to save his geographical position. By way of example, FIGS. 11A and 11B are diagrams illustrating exemplary GUIs of an exemplary application 315 displayed on display 225 of user device 110. It will be appreciated that other GUIs may be implemented that have features different from those described herein. Further, it will be appreciated that user device 110 may permit user 105 to enter information into user device 110, save information on user device 110 and/or server 120, access and/or modify information saved on user device 110 and/or server 120, in a variety of ways, such as, for example, using keypad 220, performing touch screen gestures, issuing voice commands, etc. As illustrated in FIG.

11A, user 105 may enter a command to save the geographical location by selecting from menu 1105. Fields 1110 may include GPS coordinate information. By way of example, the GPS coordinate information may be expressed in degrees and minutes. In other implementations other formats may be utilized (e.g., decimal degrees, degrees, minutes, seconds, longitude, latitude, etc.) depending on the technology or technique utilized for obtaining geographic positional information. Additionally, in some implementations, user device 110 may save directional information that corresponds to the direction user 105 is facing when creating reminder 140 or the direction user 105 should face when arriving at the location associated with reminder 140. Additionally, or alternatively, user device 110 may save altitude information.

Returning to FIG. 9, the geographical position may be saved on the user device and a server (block 915). In response to user's 105 request to save, user device 110 may save the geographical position (as well as other information) on user device 110. For example, user device 110 may include database 550. Additionally, by way of example, user device 110 may save the geographical position (as well as other information) on server 120 via base station 705. Similarly, server 120 may include database 550.

Descriptor and/or user reminder information associated with the geographical position may be saved on the user device and the server (block 920). As previously described, by way of example, user 105 may save other information, in addition to the geographical position. For example, as illustrated in FIG. 11A, user 105 may save information that describes the saved location in field 1115 (which corresponds to descriptor field 560). In this circumstance, user 105 may enter "shopping" in field 1115. User 105 may also save supplemental information in field 1120 (which corresponds to user reminder field 565). For example, in this circumstance, user 105 may enter "new antique store."

It will be appreciated that server 120 may provide certain services. For example, in the instance that user 105 saved the location without descriptor and/or reminder information, server 120 may provide user 105 with suggestions (e.g., reverse business-lookup). Also, server 120 may reference other users 105 reminders to recommend other locations that are similar. Users 105 may also rate a particular location (e.g., a store, an establishment, etc.). Server 120 may utilize ratings from users 105 to recommend other locations to user 105.

Returning to FIG. 9, user preferences for the reminder, which includes who the reminder is for, may be specified (block 925). As illustrated in FIG. 11B, user 105 may specify various parameters related to reminder 140. By way of example, user 105 may select from a distance from location field 1125, a frequency field 1130, a reminded by field 1135, and a reminder to field 1140 (which corresponds to user preferences field 570). Distance from location field 1125 may permit user 105 to specify a distance from the saved geographical position in which reminder 140 will be triggered. As previously described, for example, user 105 may specify within X number of mile(s), within X number of yard(s), within X number of feet, etc. Frequency field 1130 may permit user 105 to specify how often the user is to be reminded (e.g., once, twice, a particular day, a particular day and time, etc.). Reminded by field 1135 may permit user 105 to specify how the user is reminded (e.g., an e-mail, a text message, an audio alert, a video clip, etc.). Reminder to field 1140 may permit user 105 to specify who the reminder is for (e.g., yourself, someone else, a group of individuals, etc.). Additionally, although not illustrated, in other implementations, user 105 may specify whether the reminder is permanent, reoccurring, one time only, set to expire after a certain period of time or visits, etc.

Returning to FIG. 9, a notification of the reminder according to the user preferences may be provided (block 930). Based on user preferences associated with reminder 140, user 105 and/or other users may receive notification of reminder 140. For example, user device 110 may remind user 105 to shop at antique store 1005 next time user 105 is within 1 mile of the saved geographical position information in fields 1110. In one implementation, user device 110 may compare a current geographical position with all geographical position information associated with saved reminders 140 in database 550, in addition to recognizing other user preferences 570, to determine when, how, where, etc., to notify user 105 of reminder 140. In this example, user device 110 may compare whether user's 105 current geographical position is a distance equal to or less than 1 mile from the saved geographical position information in fields 1110. If so, user 105 may be reminded.

Although FIG. 9 illustrates an exemplary process 900, in other implementations, fewer, additional, or different operations may be performed. For example, block 925 may not be performed when user preferences have already been set. In such circumstances, user 105 may re-use these settings in subsequent reminders 140. Additionally, it will be appreciated that other operations may be performed. For example, users 105 may query server 120 for information related to reminders 140 stored thereon. That is, users 105 may share reminders 140 with friends, family, social networks, etc. In this way, users 105 that have similar interests may reap the benefits of other users 105 that have visited a particular location by obtaining feedback from their experience.

According to yet another embodiment, a user may be able to send a text message that integrates the geographical position of the user. It is recognized, that with a conventional user device, a user may obtain his or her geographical position from a navigational device and/or a navigational application, remember his or her geographical position, and text the geographical position to another user. However, such a process may be burdensome to the user. For example, the user may be required to open separate applications and remember the geographical position so that it may be sent in a text message. From a receiving user's perspective, the conventional user device may receive a text message that includes geographic positional information. The user may then have to remember the geographic positional information and enter it into the navigational device and/or the navigational application. Again, such a process may be burdensome to the user.

In contrast to conventional user devices, embodiments described herein may include a user device that permits a user to send a text message that integrates the geographical position of the user. In one implementation, the geographic positional information may be attached to a text message. This attachment may correspond to a script (e.g., a small program) that includes the geographic positional characteristics associated with the user's geographical position. Further, when the text message that includes the script is received by a receiving user device, the receiving user device may initiate an automatic wake-up call to launch a position-based application (e.g., a GPS-based application). The user operating the receiving user device may then navigate to the other user.

Process 1200 may begin with determining a geographical position (block 1205). As previously described, there are a variety of technologies or techniques that exist to determine the geographical position of user device 110 (and user 105). Additionally, these technologies or techniques may differ depending on whether user 105 is situated indoors or outdoors. By way of example, user device 110 may include a GPS receiver 325 that is capable of determining the geographical position of user device 110 (and user 105).

Figure 13:
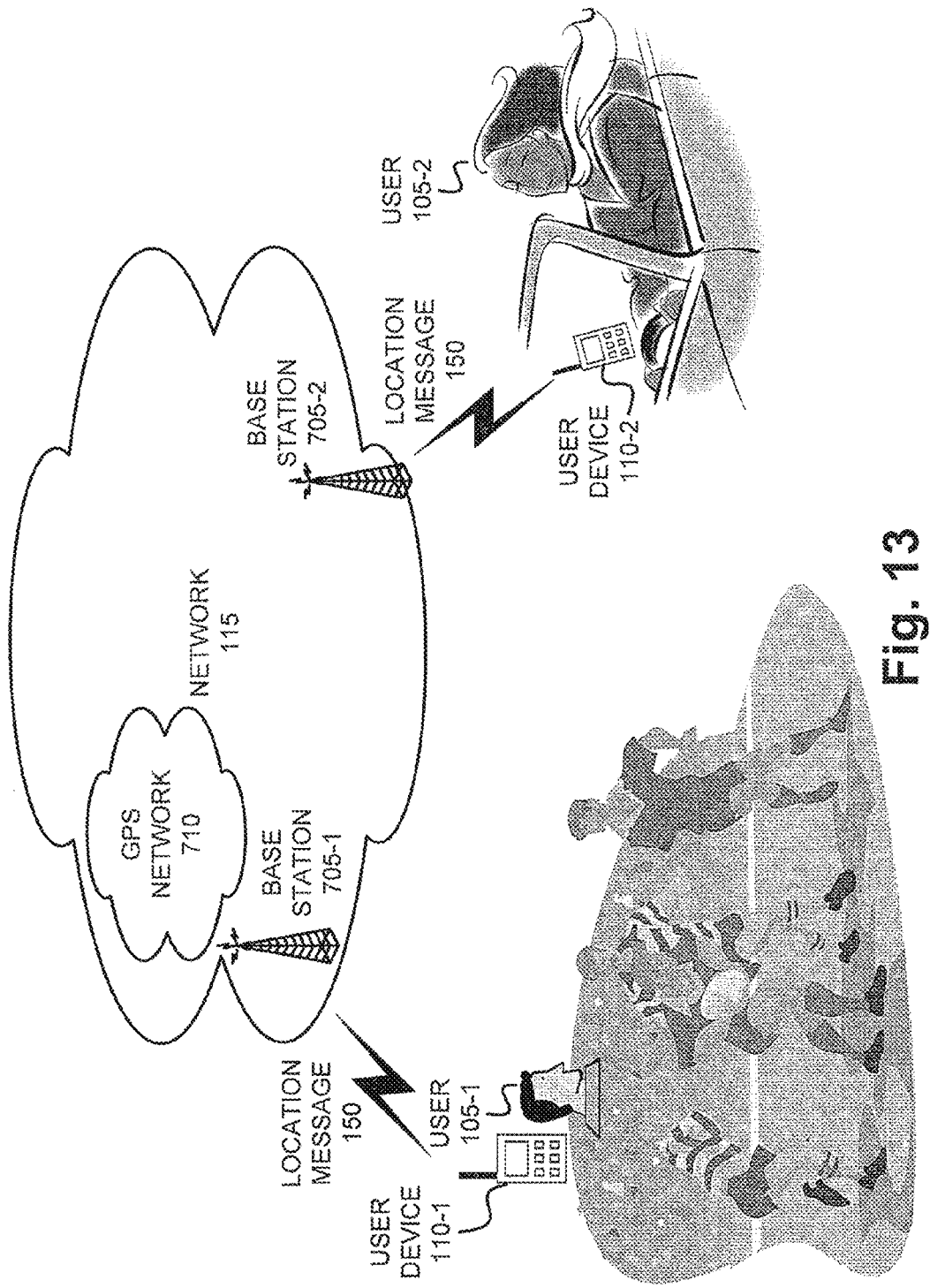
FIG. 13 is a diagram illustrating an exemplary scenario involving integrating geographic positional information.

FIG. 13 is a diagram illustrating an exemplary scenario involving integrating geographic positional information. As illustrated, user 105-1 may be watching a sporting event. User 105-2 wants to meet user 105-1 at the sporting event, however, user 105-2 is not sure how to locate user 105-1 in the crowd. As further illustrated, user 105-1 may have user device 110-1 and GPS receiver 325 may determine the geographical position of user 105-1 based on signals received from GPS network 710.

Figure 14:
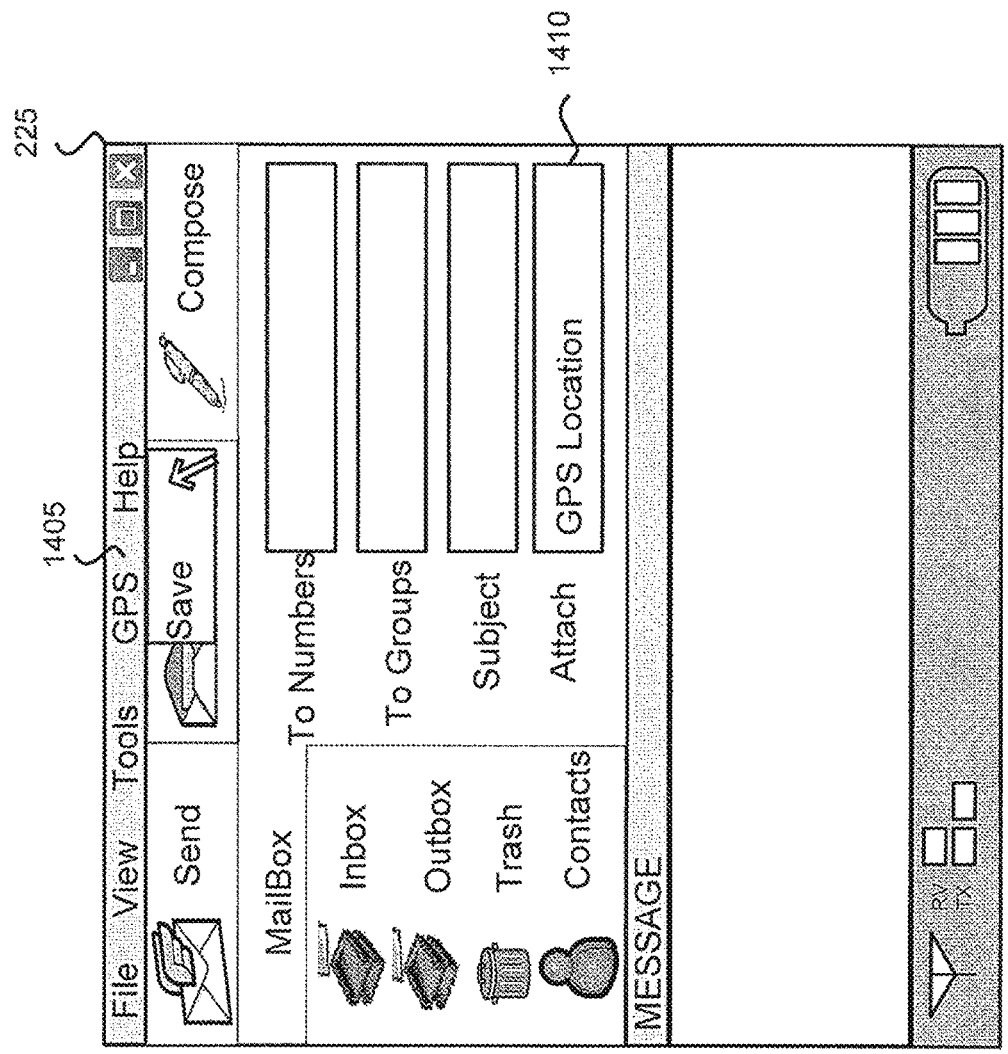
FIG. 14 is a diagram illustrating an exemplary GUI implemented at the user device of FIG. 2.

Returning to FIG. 12, a request to save the geographical position may be received (block 1210). User 105-1 would like to share his location with user 105-2. User 105-1 may enter a command to save his geographical position. By way of example, FIG. 14 is a diagram illustrating an exemplary GUI of an exemplary application 315 displayed on display 225 of user device 110. In one implementation, application 315 may correspond to a texting application (e.g., SMS or MMS). It will be appreciated that other GUIs may be implemented that have features different from those described herein. Further, it will be appreciated that user device 110 may permit user 105 to enter information into user device 110, save information on user device 110, access and/or modify information saved on user device 110, in a variety of ways, such as, for example, using keypad 220, performing touch screen gestures, issuing voice commands, etc. As illustrated in FIG. 14, user 105-1 may enter a command to save the geographical location by selecting from menu 1405. The GPS coordinate information may be expressed in degrees and minutes. In other implementations other formats may be utilized (e.g., decimal degrees, degrees, minutes, seconds, longitude, latitude, etc.) depending on the technology or technique utilized for obtaining geographic positional information. Additionally, altitude information may be determined and saved.

Returning to FIG. 12, the geographical position may be saved on the user device (block 1215). In response to user's 105-1 request to save, user device 110-1 may save the geographical position on user device 110-1.

The geographical position may be integrated with a text message (block 1220). For example, as illustrated in FIG. 14, user device 110-1 may create an attachment in attachment field 1410. This attachment may correspond to a script (e.g., a small program) that includes the geographic positional characteristics associated with user's 105-1 geographical position.

Returning to FIG. 12, the text message that integrates the geographical position may be transmitted (block 1225). For example, as illustrated in FIG. 13, user device 110-1 may transmit location message 150 to user device 110-2 via base stations 705-1 and 705-2.

Returning to FIG. 12, the text message that integrates the geographical position may be received (block 1230). For example, as illustrated in FIG. 13, user device 110-2 may receive location message 150.

Returning to FIG. 12, an automatic wake-up of a position-based application, based on the integrated geographical position, may be performed (block 1235). User device 110-2 may perform an automatic wake-up call to the position-based application so that the position-based application is launched. In one implementation, the position-based application may correspond to a GPS-based application. In other implementations, the user may be prompted before the position-based application is launched.

Navigation towards the geographical position may be provided (block 1240). For example, user device 110-2 may navigate user 105-2 to user 105-1 based on the received geographical position information.

Figure 12:
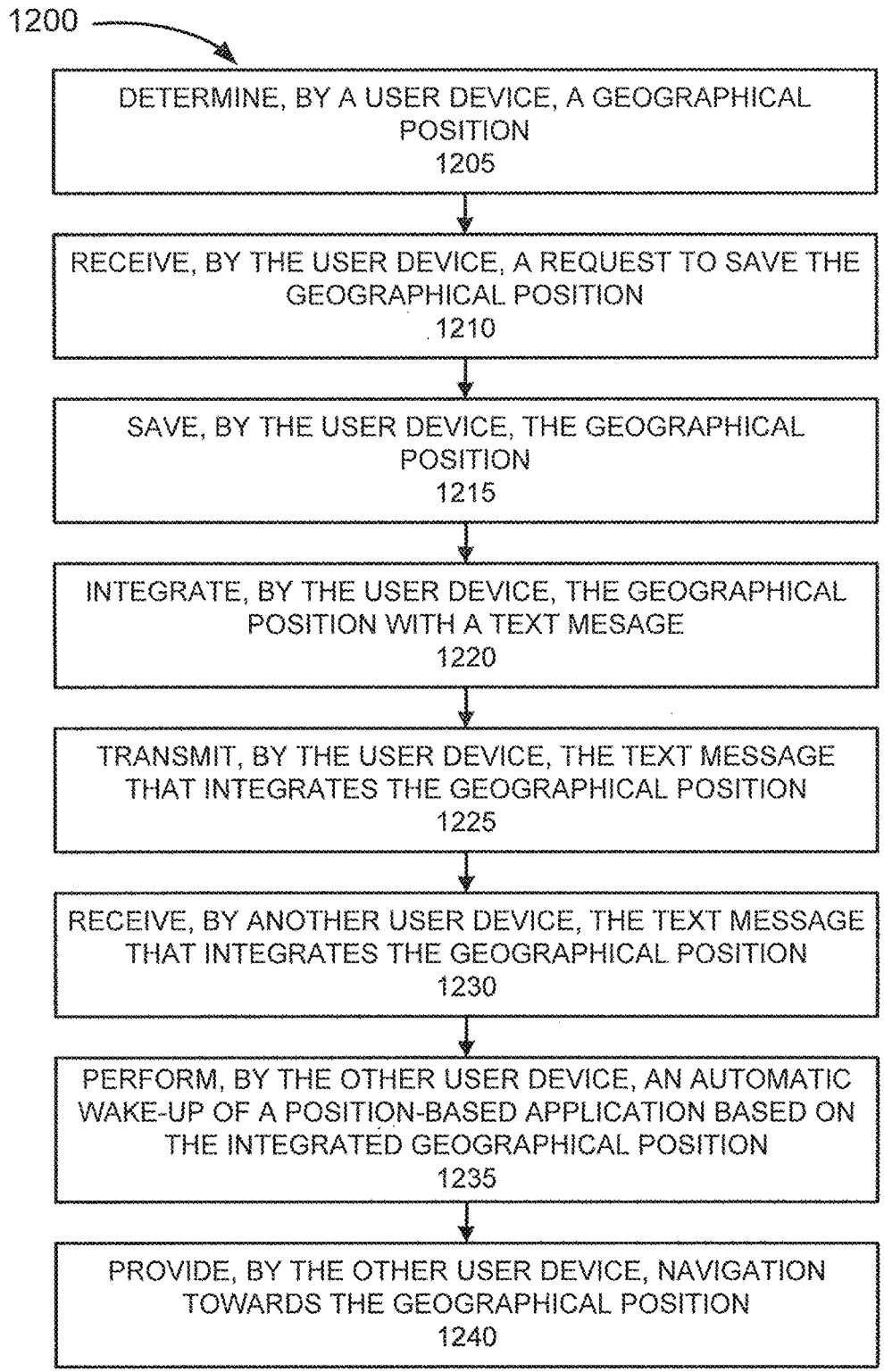
FIG. 12 is a flow diagram illustrating an exemplary process for integrating geographic positional information with a text message.

Although FIG. 12 illustrates an exemplary process 1200, in other implementations, fewer, additional, or different operations may be performed.

According to the embodiments described herein, a user device may permit a user to tag (i.e., store) a location and share the tagged location with family, friends, the user's contact list, the user's social network, etc. In other embodiments, a user device may permit a user to be reminded of something when arriving at or near a particular location. In still other embodiments, a user device may permit a user to send a text message, which integrates a location of the user, to other user(s) via other user device(s). When the receiving user device receives the text message having the integrated location, the user device may initiate an automatic wake-up call to launch a position-based application. The other user may determine the location of the user via the position-based application based on the location information integrated in the received text message.

The foregoing description of implementations provides illustration, but is not intended to be exhaustive or to limit the implementations to the precise form disclosed. Accordingly, modifications to the embodiments, implementations, etc., described herein may be possible. For example, conditional reminders may be created. By way of example, derived parameters, such as, for example, speed, velocity, and/or acceleration may be used to trigger or not trigger a reminder. In an example case, assume that the user notices, while traveling in a car, that a bridge is very icy. The user may create a reminder that if the user is traveling above a particular speed, velocity, and/or acceleration, while in a vicinity of the icy bridge, the reminder will remind the user about the icy bridge and to slow down. In one implementation, the user device may include an accelerometer or some other type of component to recognize or calculate the speed, velocity, and/or acceleration that the user is traveling. Depending on the mode of transportation (e.g., car, boat, airplane) the speed, velocity, and/or acceleration may be coupled with any vector in three-dimensional space. It will also be appreciated that bearing and/or heading information may also provide a basis for a reminder.

In another example case, the time of day may provide a basis for a reminder. In an example case, the user may notice, while traveling in a car, that children get out of school a particular time of day. The user may create a reminder that if the user is traveling in the vicinity where the children are released from school, during a particular period of time, the reminder will remind the user.

The term "may" is used throughout this application and is intended to be interpreted, for example, as "having the potential to," "configured to," or "being able to," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 6, 9, and 12, the order of the blocks may be modified in other implementations. Further, non-dependent blocks may be performed in parallel.

It will be apparent that the device(s) described herein may be implemented in many different forms of software or firmware in combination with hardware in the implementations illustrated in the figures. The actual software code (executable by hardware) or specialized control hardware used to implement these concepts does not limit the disclosure of the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
    providing, by a user device, a graphical user interface of a Short Messaging Service (SMS) or Multimedia Messaging Service (MMS) application of the user device,
        the graphical user interface including an option for sharing information associated with a geographical position of a user of the user device;
    receiving, by the user device and from a user of the user device, a request associated with sharing, with one or more other users, the information associated with the geographical position of the user,
        the user being different than the one or more other users, and
        the request being received via the option for sharing of the graphical user interface of the SMS or MMS application;
    determining, by the user device and using a global positioning system (GPS) receiver of the user device, the geographical position;
    generating, by the user device, information regarding the geographical position after determining the geographical position;
    receiving, by the user device, information identifying the one or more other users,
        the information identifying the one or more other users being received via the graphical user interface of the SMS or MMS application;
    integrating, by the user device, the information regarding the geographical position in a SMS or MMS message of the SMS or MMS application,
        the information regarding the geographical position including a script that includes geographic positional characteristics associated with the geographical position, and
        the script being a program; and
    transmitting, by the user device, the SMS or MMS message that includes the information regarding the geographical position to one or more devices of the one or more other users,
        the SMS or MMS message being transmitted to the one or more devices via a network,
        the script, included in the information regarding the geographical position included in the SMS or MMS message, causing the one or more devices to initiate an automatic wake-up call that launches a position-based application on the one or more devices, and
        the position-based application providing, based on the script included in the information regarding the geographical position included in the SMS or MMS message, information for navigating towards the geographical position.

2. The method of claim 1, where the information identifying the one or more other users includes at least one of:
    information identifying a contacts list associated with the user of the user device, or
    information identifying that the one or more other users are associated with the user.

3. The method of claim 1, where the graphical user interface includes a field that identifies the information regarding the geographical position, a field that identifies a subject of the SMS or MMS message, a field that identifies the information identifying the one or more other users, and the option for sharing the information associated with the geographical position.

4. The method of claim 1, where the user device includes at least one of a telephone application, a camera application, or a video application.

5. The method of claim 1, where the geographical position includes GPS coordinate information of the geographical position.

6. The method of claim 1, where transmitting the SMS or MMS message that includes the information regarding the geographical position includes:
    transmitting a SMS message that includes the information regarding the geographical position.

7. The method of claim 1,
    where the SMS or MMS message is a MMS message, and
    where the position-based application is a GPS-based application.

8. A user device comprising:
    a memory to store instructions; and
    a processor to execute the instructions in the memory to:
        receive, from a user of the user device, a request associated with sharing information associated with a location of the user,
            the request being received via a Short Messaging Service (SMS) or Multimedia Messaging Service (MMS) application of the user device,
        determine a geographical position of the user device based on the request associated with sharing the information associated with the location of the user, the geographical position corresponding to the location, generate information regarding the geographical position,
        provide information identifying a plurality of groups of users,
        receive information identifying a group of users, of the plurality of groups of users, with which the information associated with the location is to be shared,
            the group of users being different than the user, and
            the information identifying the group of users being received via the SMS or MMS application,
        integrate the information regarding the geographical position in a SMS or MMS message of the SMS or MMS application,
            the information regarding the geographical position including a script relating to with the geographical position, and the script being a program; and transmit, via a network and to devices associated with the group of users, the SMS or MMS message that includes the information regarding the geographical position, the script, included in the information regarding the geographical position, causing each of the devices to initiate an automatic wake-up call that launches a position-based application that provides navigation towards the geographical position based on the information regarding the geographical position included in the SMS or MMS message.

9. The user device of claim 8, where, when providing the information identifying the plurality of groups of users, the processor is to provide information identifying at least one of:
a contacts list of the user,
a social network,
a blog, or
a wiki.

10. The user device of claim 8, further comprising a global positioning system receiver,
where, when determining the geographical position of the user device, the processor is to determine the geographical position of the user device based on the global positioning system receiver.

11. The user device of claim 8, where the user device includes a mobile telephone.

12. The user device of claim 8, where the script includes geographic positional characteristics associated with the geographical position.

13. The user device of claim 8, where the geographical position comprises:
global positioning system coordinate information of the geographical position.

14. The user device of claim 8, where the processor further is to:
receive a different request to save information identifying the geographical position, and
save the information identifying the geographical position based on the different request.

15. A non-transitory computer-readable medium storing instructions, the instructions comprising:
one or more instructions which, when executed by at least one processor of a device, cause the at least one processor to:
determine a geographical position of the device using a global positioning system (GPS) receiver associated with the device;
receive, from a user of the device, a request associated with sharing information associated with the geographical position;
generate information regarding the geographical position;
receive, from the user, information identifying one or more users;
integrate the information regarding the geographical position in a Short Messaging Service (SMS) or Multimedia Messaging Service (MMS) message of a SMS or MMS application of the device,
the information regarding the geographical position including a script that includes geographic positional characteristics associated with the geographical position, and
the script being a program; and
transmit, to one or more devices of the one or more users, the SMS or MMS message that includes the information regarding the geographical position,
the information regarding the geographical position, included in the message, causing each of the one or more devices to initiate an automatic wake-up call that launches an application that provides, based on the information regarding the geographical position included in the message, information for navigating towards the geographical position.

16. The non-transitory computer-readable medium of claim 15, where the one or more users are identified based on at least one of:
a social network,
a blog, or
a wiki.

17. The non-transitory computer-readable medium of claim 15, where the one or more instructions to transmit, to the one or more devices, the SMS or MMS message that includes the information regarding the geographical position include:
one or more instructions to transmit, via a SMS message, the information regarding the geographical position to the one or more devices of the one or more users.

18. The non-transitory computer-readable medium of claim 15, the instructions further comprising one or more instructions to:
present, to the user and via a display of the device, a graphical user interface that includes afield that identifies the information regarding the geographical position, a field that identifies a subject of the message, a field that identifies the information identifying the one or more users, and an option for sharing the information associated with the geographical position,
where the request and the information identifying the one or more users are received via the graphical user interface.

19. The non-transitory computer-readable medium of claim 18, where the graphical user interface is associated with the SMS or MMS application.

20. The non-transitory computer-readable medium of claim 15, where the script causes each of the one or more devices to launch a GPS-based application that provides information for navigating towards the geographical position.

21. The non-transitory computer-readable medium of claim 15, the instructions further comprising one or more instructions to:
receive a different request to save information identifying the geographical position; and
save the information identifying the geographical position based on the different request.

* * * * *